(12) United States Patent
Kimura

(10) Patent No.: US 7,515,818 B2
(45) Date of Patent: Apr. 7, 2009

(54) IMAGE CAPTURING APPARATUS

(75) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 579 days.

(21) Appl. No.: 11/262,066

(22) Filed: Oct. 27, 2005

(65) Prior Publication Data

US 2006/0092313 A1 May 4, 2006

(30) Foreign Application Priority Data

Oct. 29, 2004 (JP) .............................. 2004-317027

(51) Int. Cl.
  G02B 7/28 (2006.01)
  G02B 7/099 (2006.01)
(52) U.S. Cl. ...................... 396/111; 348/343
(58) Field of Classification Search ................. 396/100, 396/101, 110–113, 153, FOR. 706; 348/208.7, 348/343, 362; 356/3.13; 353/20; 349/9
  See application file for complete search history.

(56) References Cited

U.S. PATENT DOCUMENTS

| | | | | |
|---|---|---|---|---|
| 4,258,989 A | * | 3/1981 | Tokutomi et al. | 396/111 |
| 4,561,748 A | * | 12/1985 | Omaki et al. | 396/110 |
| 5,023,723 A | * | 6/1991 | Date et al. | 348/337 |
| 5,359,364 A | * | 10/1994 | Kayanuma et al. | 348/343 |
| 5,883,872 A | | 3/1999 | Kino | |
| 6,729,730 B2 | | 5/2004 | Ito | |
| 6,923,544 B2 | | 8/2005 | Ito | |
| 2002/0012052 A1 | | 1/2002 | Nagano | |
| 2002/0018184 A1 | | 2/2002 | Ito | |
| 2004/0042781 A1 | * | 3/2004 | Mihara | 396/249 |

FOREIGN PATENT DOCUMENTS

| | | |
|---|---|---|
| JP | 47-23929 | 7/1972 |
| JP | 63-018313 | 1/1988 |
| JP | 63-055501 | 3/1988 |
| JP | 39-5265 | 4/1989 |

(Continued)

OTHER PUBLICATIONS

Dialog English Abstract for JP 5-088445.

(Continued)

*Primary Examiner*—Melissa Jan Koval
*Assistant Examiner*—Autumn Parker
(74) *Attorney, Agent, or Firm*—Locke Lord Bissell & Liddell LLP

(57) ABSTRACT

This invention provides an image capturing apparatus which sets the spectral characteristics of a split light beam to be substantially equal to those of straight traveling light upon splitting a light beam coming from a photographing optical system and enables an autofocus detection function by the split light with a sufficient light amount. A digital camera includes a photographing optical system, beam splitter, focus detection sensor, polarizing filter, and CMOS sensor. The beam splitter splits a light beam which travels toward the CMOS sensor that receives an object image formed by the photographing optical system, depending on the direction of polarization, and the focus detection sensor performs focus detection based on the light beam split by the beam splitter. The polarizing filter removes substantially the same polarized light component as a polarized light component that travels toward the focus detection sensor as a result of splitting by the beam splitter.

9 Claims, 53 Drawing Sheets

FOREIGN PATENT DOCUMENTS

| | | |
|---|---|---|
| JP | 5-088445 | 4/1993 |
| JP | 6-175010 | 6/1994 |
| JP | 6-318383 | 11/1994 |
| JP | 2003-140246 | 5/2003 |
| KR | 2001-0078318 | 8/2001 |

OTHER PUBLICATIONS

Dialog English Abstract for JP 63-055501.
Dialog English Abstract for JP 6-318313.
Dialog English Abstract for JP 6-175010.
Dialog English Abstract for JP 2003-140246.
English Abstract for JP 63-018313.
EPO Communication, including Search Report, issued in corresponding European Patent Application 05 02 3075.
Communication pursuant to Article 96(2) EPC dated Feb. 28, 2007 for the counterpart European patent application No. 05023075.4-1524.

* cited by examiner

F I G. 10
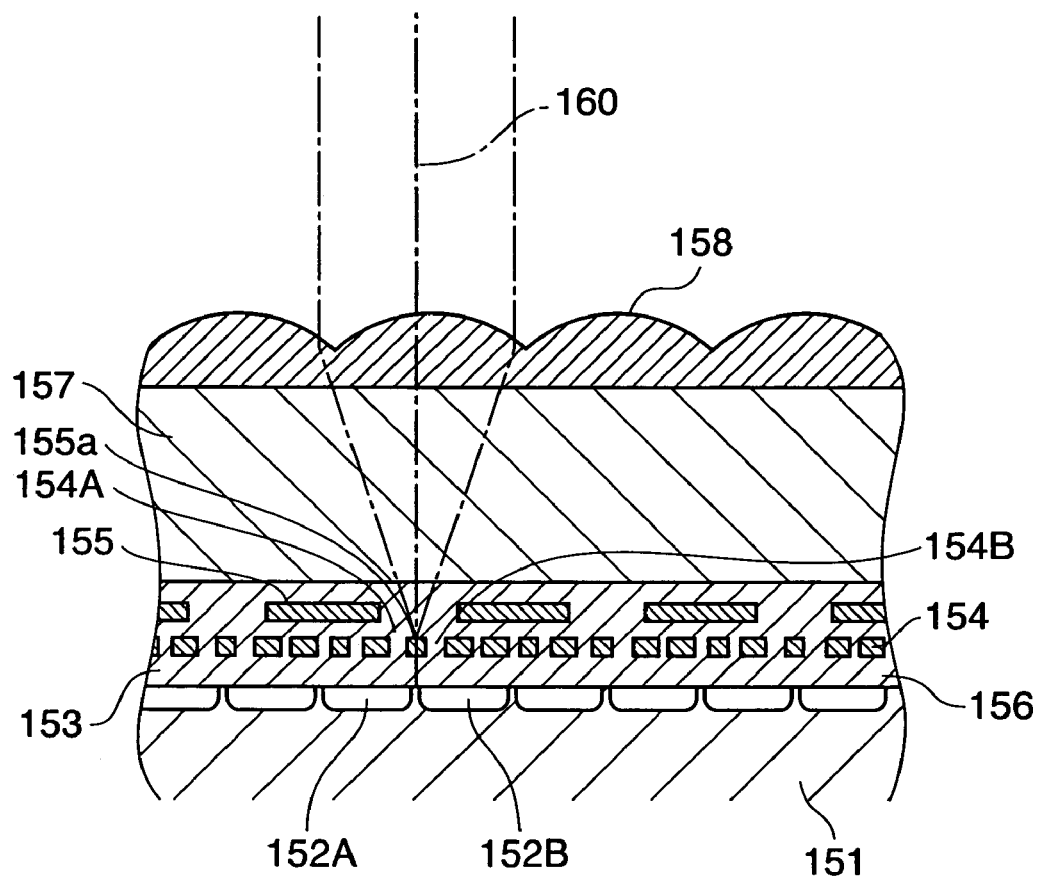

F I G. 20
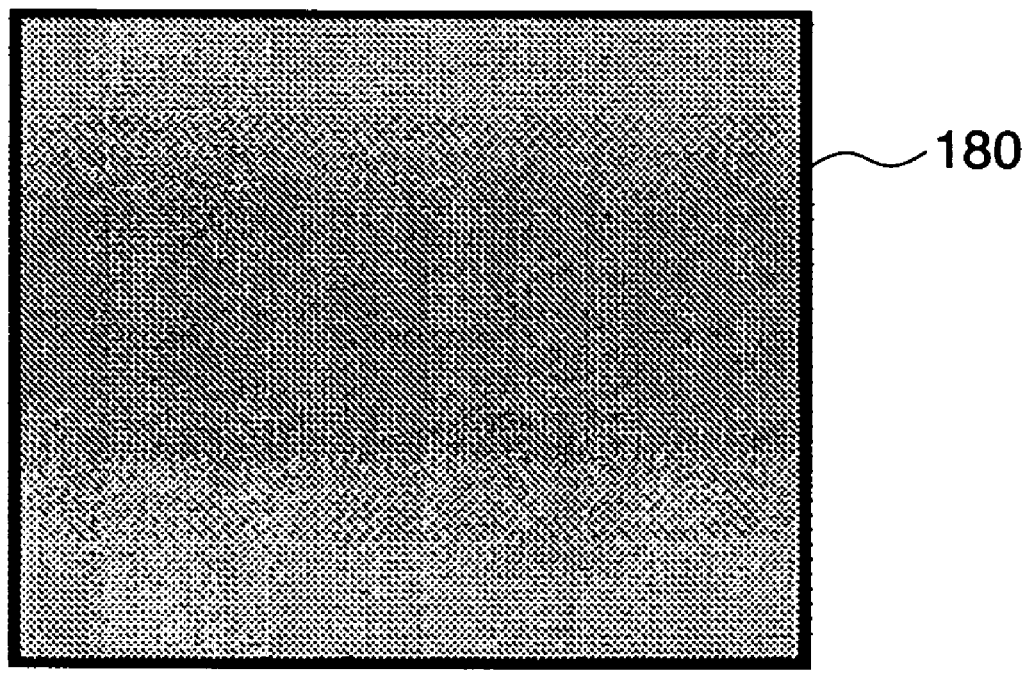

F I G. 28A
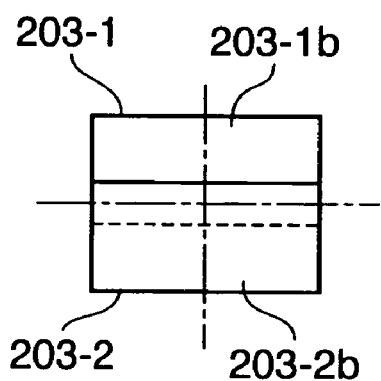
F I G. 28B
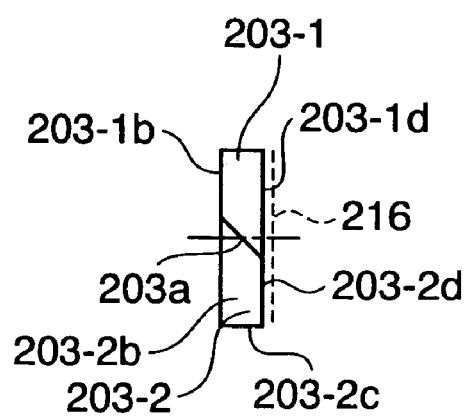

(Prior Art)

(Prior Art)

(Prior Art)

(Prior Art)

IMAGE CAPTURING APPARATUS

FIELD OF THE INVENTION

The present invention relates to an image capturing apparatus which can be applied to a case wherein a light beam input via a photographing optical system is divided or split into a plurality of light beam components, which are guided to a light-receiving device to attain focus detection based on a pupil splitting method.

BACKGROUND OF THE INVENTION

Conventionally, a focus detection method used in a camera includes a focus detection method based on triangulation used in a lens shutter camera, that based on contrast detection used in a video camera or the like, that based on pupil splitting used in a single-lens reflex camera, and the like.

In the focus detection method based on triangulation, infrared light is projected onto an object, and light reflected by the object is received by a sensor such as a PSD or the like via a light-receiving lens which is located at a position different from the projection light, thereby detecting a distance from that light-receiving position to the object (see Japanese Patent Publication No. 47-23929).

However, when the focus detection method based on triangulation is applied to a digital still camera, since a photographing optical system is different from a ranging optical system, a ranging region changes unwontedly when the photographing optical system undergoes zooming.

In the focus detection method based on contrast detection, a change in contrast of an image captured by an image sensor is detected while driving a photographing lens, so as to attain focus detection based on that change amount (see Japanese Patent Publication No. 39-5265).

However, since the focus detection method based on contrast detection detects a change in contrast of an image captured by the image sensor while moving the photographing lens, and detects a focus state based on that change amount, focus detection takes long time in, e.g., a state largely different from an in-focus state. Furthermore, this method cannot attain focus detection of a moving object.

In the focus detection method based on pupil splitting of a photographing lens, a focus state of the photographing lens is detected by calculating a correlation between two images generated by light beams which are transmitted through different pupil regions of the photographing lens (see Japanese Patent Laid-Open No. 63-18313).

Also, an optical apparatus which forms a part of a stop of a photographing optical system by a polarizing plate, and comprises a beam splitter, which guides some light components of a light beam outside an optical path so as to attain AF, between the stop and an image sensor, and a polarizing plate between the beam splitter and image sensor, has been proposed. This proposal discloses, as a second embodiment, an example in which the entire light beam is covered by a polarization beam splitter and the polarizing plate and polarization beam splitter are formed by identical components (see Japanese Patent Laid-Open No. 6-175010).

In this optical apparatus, even when stop blades are in a close state, a light beam which is transmitted through the portion formed by the polarizing plate reaches an AF sensor to attain AF. In addition, since the light beam is intercepted by the polarizing plate arranged between the beam splitter and image sensor, the close state is maintained on an image capturing plane. The same effect can also be obtained in the arrangement in which the polarization beam splitter covers the entire light beam.

FIG. 50 shows a schematic arrangement of the optical apparatus disclosed in Japanese Patent Laid-Open No. 6-175010 above.

Referring to FIG. 50, reference numeral 901 denotes a photographing optical system; 902, a light-receiving device such as a photo film, CCD sensor, or the like, and has sensitivity to only visible light; and 903, a beam splitter.

An image captured by the light-receiving device 902 is developed to form a photo original plate in case of a film camera, or is displayed on an electronic viewfinder (EVF), is recorded on a memory, or is printed out by a printer in case of a digital color camera.

A dielectric multilayered film is formed on a light splitting function surface 903a of the beam splitter 903, and the surface 903a reflects 50% visible light components of object light output from the photographing optical system 901 and transmits 50% remaining light components. Light reflected by the light splitting function surface 903a is totally reflected by a surface 903b of the beam splitter 903, and exits the beam splitter 903 via a surface 903c.

An example that pertains to a digital single-lens reflex camera which forms a primary object image (objective image) formed by the photographing optical system on a two-dimensional light-receiving sensor such as a CCD sensor, CMOS process compatible sensor (to be simply referred to as a CMOS light-receiving sensor hereinafter), or the like, and photoelectrically converts the optical image to obtain an image output associated with an object is disclosed (see Japanese Patent Laid-Open No. 2003-140246).

This digital single-lens reflex camera as one of optical apparatuses includes a beam splitter which transmits light in a visible wavelength range without decreasing its light amount, and splits light in a wavelength range near an infrared range. Light in the wavelength range near the infrared range, whose optical path is split by the beam splitter, is used in focus detection, and light which goes straight undergoes image capturing.

By limiting the light splitting function surface of the beam splitter to a range through which a focus detection light beam passes, a low-profile beam splitter can be adopted, and can be laid out in a small space between the photographing optical system and a mirror which deflects an optical path to a viewfinder optical system without increasing the camera size. Since the spectral transmittance characteristics of the beam splitter are set to be nearly 100% in the visible wavelength range, a bright, high-quality image can be obtained without decreasing the light amount of the visible wavelength range required to capture an object image.

Since the optical apparatus (FIG. 50) disclosed in Japanese Patent Laid-Open No. 6-175010 adopts an arrangement for guiding only a light beam required for focus detection to the AF sensor, the beam splitter can be downsized. However, in practice, an image captured using straight traveling light suffers luminance nonuniformity unless the light splitting function surface of the beam splitter has a size as large as it can cover the entire light beam associated with image capturing, thus considerably deteriorating the image quality. When the beam splitter is arranged in the vicinity of a pupil plane of the photographing optical system, luminance nonuniformity hardly occurs. However, since the amount of light which is transmitted through the central portion of the pupil is reduced, the contrast of an image undesirably drops.

When this optical apparatus is, e.g., an infrared ray camera, the light-receiving device 902 in FIG. 50 has sensitivity to only infrared rays, and the light splitting function surface 903*a* of the beam splitter 903 is configured to split infrared rays. Since visible light transmitted through the light splitting function surface 903*a* is attenuated to ½, as described above, even if an object to be captured is a uniform luminance surface, an image captured by the light-receiving device 902 becomes like an image 910 on which upper and lower bright regions 912 and 913 are formed to sandwich a central dark region 911, as shown in FIG. 51.

Such phenomenon undesirably results in an image on which an unnatural luminance difference is conspicuous in a portion which should have uniform luminance and whose image quality deteriorates considerably, when blue sky, a white wall of a building, or the like is captured.

To solve such problems, an optical apparatus in which extinction parts 905*a* and 905*b* are arranged in front of the beam splitter 903, as shown in FIG. 52, has been developed. In this optical apparatus, when gaps are formed between the extinction parts, luminance nonuniformity as shown in FIG. 53A occurs; when overlapping portions are formed between the extinction parts, luminance nonuniformity as shown in FIG. 53B occurs.

In the second embodiment of the optical apparatus disclosed in Japanese Patent Laid-Open No. 6-175010, the polarization beam splitter becomes bulky since it must cover the entire light beam. As a result, large dimensions are required between an optical lens group and image sensor, and it is difficult to attain a size reduction of the apparatus.

The example disclosed in Japanese Patent Laid-Open No. 2003-140246 will be described below. In general, in the optical structure which splits an optical path of a light beam fetched via the photographing optical system into a plurality of light beam components, and guides them to the light-receiving device, advantages are often provided when the plurality of split light beam components have substantially the same wavelength characteristics.

In the camera disclosed in Japanese Patent Laid-Open No. 2003-140246, since light in the wavelength range near the infrared range, which is split by the beam splitter, is used in focus detection, aberration correction of the photographing optical system must be done in this wavelength range so as to correctly function the focus detection.

If the aberration correction is insufficient, it is impossible to strictly adjust a focus in the visible wavelength range using the light near the infrared range. On the other hand, when aberration correction is to be made for a range near the infrared range in addition to the visible wavelength range, a measure such as use of special glass, an increase in the number of lenses which form the photographing optical system, or the like is undesirably required, resulting in increases in cost and size. Especially, when the photographing optical system is exchangeable like in the single-lens reflex camera which comprises large-scale exchangeable lens systems, all the exchangeable lens systems must support such focus detection system, and it is very difficult to realize such system.

When the exposure value upon image capturing is to be determined by measuring the object luminance using a light beam split by the beam splitter, a phenomenon similar to that of focus detection occurs. More specifically, when the wavelength range for luminance measurement shifts from that for image capturing, since it is difficult to strictly estimate light energy included in the wavelength range for exposure from that included in the wavelength for luminance measurement, if image capturing is done by determining the exposure value on the basis of the measurement result of the object luminance, an underexposure or overexposure image capturing result may occur.

SUMMARY OF THE INVENTION

It is an object of the present invention to provide an image capturing apparatus which sets spectral characteristics of split light beams to be substantially equal to those of straight traveling light and enables an auto focus detection function by the split light with a sufficient light amount when a light beam coming from a photographing optical system is split.

In order to achieve the above object, according to the first aspect of the present invention, an image capturing apparatus comprises: a light beam splitting device for splitting some light components of a light beam, which travels toward a prospective imaging plane that receives an object image formed by a photographing optical system, depending on a direction of polarization; a focus detection device for making focus detection on the basis of the light beam split by the light beam splitting device; and an extinction device, arranged between the light beam splitting device and the prospective imaging plane, for removing substantially the same polarized light component as a polarized light component that travels toward the focus detection device as a result of light beam splitting by the light beam splitting device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a sectional view showing the arrangement of a pixel portion of the focus detection sensor;

FIG. 20 shows the degree of occurrence of luminance nonuniformity on an image;

FIG. 28A is a front view of a beam splitter;

FIG. 28B is a side view of the beam splitter;

DETAILED DESCRIPTION OF THE PREFERRED EMBODIMENTS

Preferred embodiments of the present invention will be described hereinafter with reference to the accompanying drawings.

First Embodiment

Figure 1:
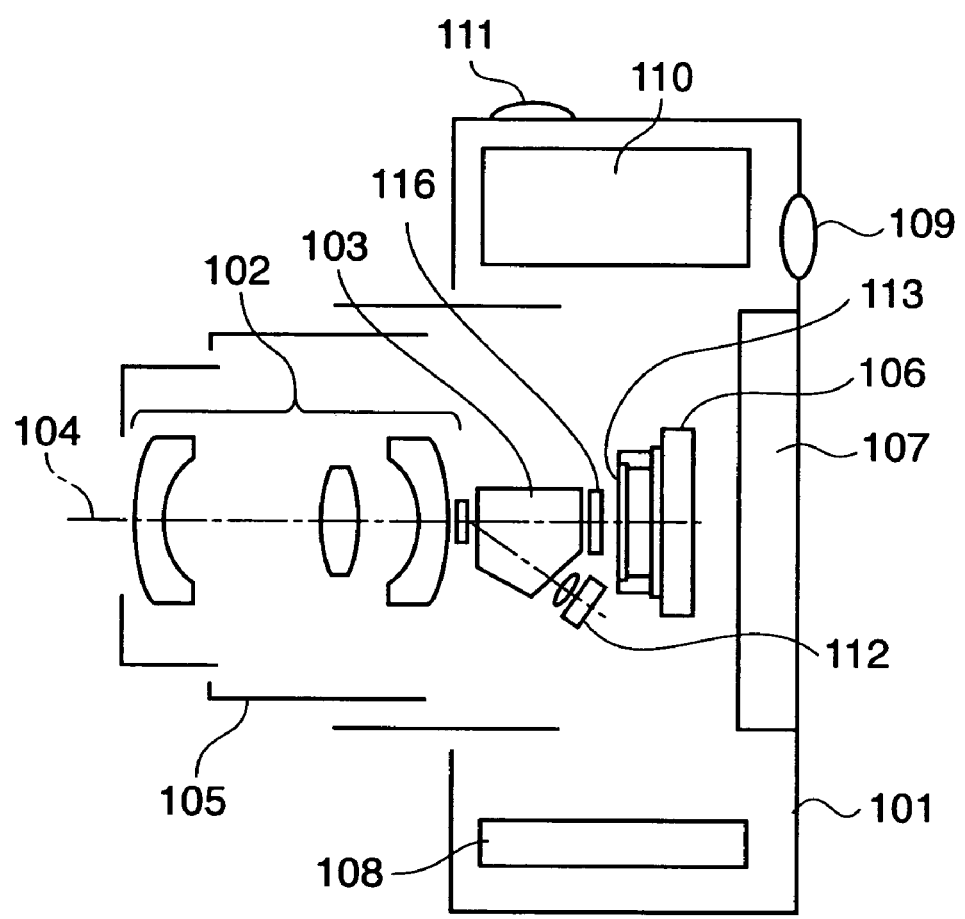
FIG. 1 is a sectional view showing the arrangement of a digital camera as an image capturing apparatus according to the first embodiment of the present invention.

FIG. 1 is a sectional view showing the arrangement of a digital camera as an image capturing apparatus according to the first embodiment of the present invention.

Referring to FIG. 1, the digital camera is roughly configured by a digital camera main body 101 which includes a beam splitter 103 as a light beam splitting device, a CMOS light-receiving sensor 106, and the like, and a lens barrel 105 that houses a photographing optical system 102. FIG. 1 illustrates the digital camera in a state wherein it performs focus adjustment to capture an electronic viewfinder (EVF) image.

The lens barrel 105 houses the photographing optical system 102 used to form an object image (objective image). The photographing optical system 102 can adjust its imaging position in a direction of an optical axis 104 by an energy source and drive mechanism (neither are shown). A focusing lens in the photographing optical system 102 is formed by a flexible transparent elastic member or liquid lens, and the refracting power of the focusing lens is changed by changing its interface shape, so as to adjust a focus to an object. Note that the photographing optical system 102 may comprise a single focus lens, zoom lens, shift lens, or the like, or may be exchangeable to other photographing optical systems having various characteristics (f-numbers (aperture values), focal lengths, and the like).

The digital camera main body 101 comprises the beam splitter 103, the two-dimensional CMOS light-receiving sensor 106, a display device 107, a memory card 108 for storing image data, an eyepiece 109 for an optical viewfinder, a wireless communication device 110 for making a data communication with a printer or the like, a shutter release button 111, a focus detection sensor 112, an optical low-pass filter 113, and a polarizing filter 116.

The beam splitter 103 splits some light components of a light beam that travels toward the CMOS light-receiving sensor 106 on which an object image formed by the photographing optical system 102 is formed. The focus detection sensor 112 performs focus detection on the basis of the light beam split by the beam splitter 103. The polarizing filter 116 is arranged between the beam splitter 103 and CMOS light-receiving sensor 106, and removes a polarized light component nearly equal to that which travels toward the focus detection sensor 112 by light beam splitting of the beam splitter 103.

The beam splitter 103 and optical low-pass filter 113 engage with a mechanical drive mechanism (not shown). Upon capturing a high-definition image, the optical low-pass filter 113 is inserted instead to the position of the beam splitter 103. Upon capturing an EVF image, a light transmitted through the beam splitter 103 is projected onto the CMOS light-receiving sensor 106.

The display device 107 is attached to the back surface side of the digital camera main body 101. An object image caught by the CMOS light-receiving sensor 106 is displayed on the display device 107. The user can directly observe this image as an EVF.

The CMOS light-receiving sensor 106 is an amplified solid-state image sensor which is CMOS process-compatible. An advantage of the CMOS light-receiving sensor is that, since MOS transistors of an area sensor unit and peripheral circuits such as an image sensor drive circuit, A/D conversion circuit, image processing circuit, and the like can be formed in a single step, the number of masks, the number of process steps, and the like can be greatly reduced compared to a CCD sensor. Also, the CMOS light-receiving sensor 106 has a feature of allowing random access to arbitrary pixels, and can enable real-time display of an image at a high display rate by a read process while decimating pixels. The CMOS light-receiving sensor 106 exploits this feature to perform an EVF image output operation based on the decimated read process, and a high-definition image output operation by reading out all the pixels.

Figure 2:
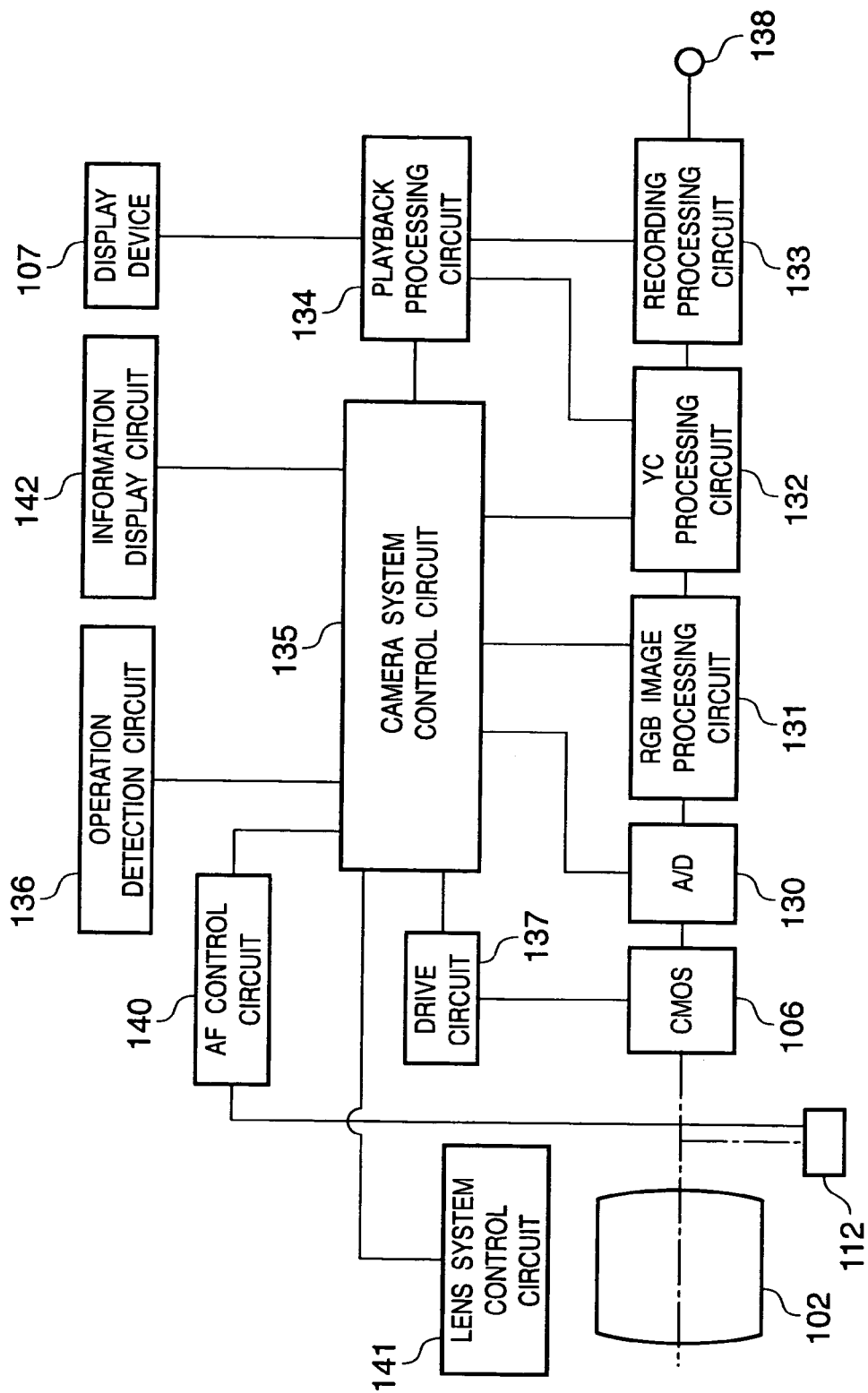
FIG. 2 is a block diagram showing the electrical arrangement of the digital camera.

FIG. 2 is a block diagram showing the electrical arrangement of the digital camera.

In FIG. 2, circuits associated with capturing and recording of an object image in the digital camera will be explained first. The digital camera has an image capturing system, image processing system, recording/playback system, and control system. The image capturing system includes the photographing optical system 102 and CMOS light-receiving sensor 106. The image processing system includes an A/D converter 130, RGB image processing circuit 131, and YC processing circuit 132. The recording/playback system includes a recording processing circuit 133 and playback processing circuit 134. The control system includes a camera system control circuit 135, operation detection circuit 136, and CMOS light-receiving sensor drive circuit 137. A connection terminal 138 is standardized to exchange data by connecting an external computer or the like. These electric circuits are driven by a compact fuel battery (not shown).

The image capturing system is an optical processing system which forms light coming from an object into an image on the image capturing surface of the CMOS light-receiving sensor 106 via the photographing optical system 102. The image capturing system adjusts a stop and mechanical shutter (neither are shown) of the photographing optical system 102 to expose the CMOS light-receiving sensor 106 with an appropriate amount of object light. The CMOS light-receiving sensor 106 comprises a light-receiving element on which 3,700×2,800 square pixels are arranged in the longitudinal and widthwise directions to have a total of about ten-million pixels, and which forms a so-called Bayer matrix with four pixels as one set by alternately arranging R (red), G (green), and B (blue) color filters on the pixels.

The RGB image processing circuit 131 is a signal processing circuit that processes image signals of 3,700×2,800 pixels received from the CMOS light-receiving sensor 106 via the A/D converter 130, and comprises a white balance circuit, gamma correction circuit, and interpolation arithmetic circuit that performs high-resolution conversion by interpolation arithmetic operations.

The YC processing circuit 132 is a signal processing circuit that generates a luminance signal Y and color difference signals R-Y and B-Y, and comprises a high-frequency luminance signal generation circuit for generating a high-frequency luminance signal YH, a low-frequency luminance signal generation circuit for generating a low-frequency luminance signal YL, and a color difference signal generation circuit for generating the color difference signals R-Y and B-Y. The luminance signal Y is formed by mixing the high- and low-frequency luminance signals YH and YL.

The recording/playback system is a processing circuit for outputting an image signal to a memory and outputting an image signal to the display device 107. The recording processing circuit 133 executes write processing and read processing of an image signal on/from the memory. The playback processing circuit 134 plays back an image signal read out from the memory, and outputs it to the display device 107.

The recording processing circuit 133 includes a compression/decompression circuit (not shown) which compresses YC signals that represent a still image and moving image by a predetermined compression format, and decompresses compressed data when it is read out. The compression/decompression circuit includes a frame memory and the like for signal processing, stores YC signals from the image processing system in this frame memory for each image, and compression-encodes the signals by reading them out for every plurality of blocks. The compression encoding is done by applying, e.g., two-dimensional orthogonal transformation, normalization, and Huffman encoding to image signals for respective blocks.

The playback processing circuit 134 matrix-converts the luminance signal Y and color difference signals R-Y and B-Y into, e.g., RGB signals. The signals converted by the playback processing circuit 134 are output to the display device 107 and are displayed and played back as a visible image. The playback processing circuit 134 and the display device 107 or a printer (not shown) may be connected via a wireless communication device such as Bluetooth or the like. With this arrangement, an image captured by this digital camera can be monitored from a remote place, and a captured image can be printed without the intervention of any personal computer.

The control system includes the operation detection circuit 136 for detecting operations of the shutter release button 111 and the like, the camera system control circuit 135 for controlling respective units in response to the detection signal and generates and outputs timing signals and the like upon image capturing, the CMOS light-receiving sensor drive circuit 137 for generating a drive signal that drives the CMOS light-receiving sensor 106 under the control of the camera system control circuit 135, and an information display circuit 142 for controlling an information display device in an optical viewfinder and that located outside the digital camera.

The control system controls the image capturing system, image processing system, and recording/playback system in response to external operations. For example, upon detection of depression of the shutter release button 111, the control system controls driving of the CMOS light-receiving sensor 106, operations of the RGB image processing circuit 131, compression processing of the recording processing circuit 133, and the like, and also controls, using the information display circuit 142, the states of respective segments of the information display devices that display information on the optical viewfinder and the like.

To the camera system control circuit 135, an AF control circuit 140 and lens system control circuit 141 are further connected. These circuits communicate data required for respective processes with each other to have the camera system control circuit 135 as the center.

The AF control circuit 140 generates a focus detection signal by obtaining signal outputs from the focus detection view fields of the focus detection sensor 112, which are set in correspondence with predetermined positions on a photographing screen, and detects the focusing state of the photographing optical system 102. Upon detection of a defocus (out-of-focus) state, the AF control circuit 140 converts a drive amount of the focusing lens as one component of the photographing optical system 102, and transmits it to the lens system control circuit 141 via the camera system control circuit 135.

On the other hand, for a moving object, the AF control circuit 140 takes into account a time lag from depression of the shutter release button 111 until actual image capturing control starts, predicts an appropriate lens position, and instructs a focusing lens drive amount. When it is determined that the luminance of an object is low and sufficient focus detection precision cannot be obtained, the AF control circuit 140 controls a flash emission device, white LED, or fluorescent tube (none of them are shown) to illuminate the object with light so as to compensate for a luminance shortfall.

Upon reception of the focusing lens drive amount, the lens system drive circuit 141 adjusts a focus to an object by moving the focusing lens in the photographing optical system 102 in the direction of an optical axis L1 using a drive mechanism (not shown). When the AF control circuit 140 detects as a result of a series of focus adjustment operations that the object is set in an in-focus state, detection information is sent to the camera system control circuit 135. At this time, when the shutter release button 111 is pressed to its second stroke position, the image capturing control by the image capturing system, image processing system, and recording/playback system is done, as described above.

Figure 3:
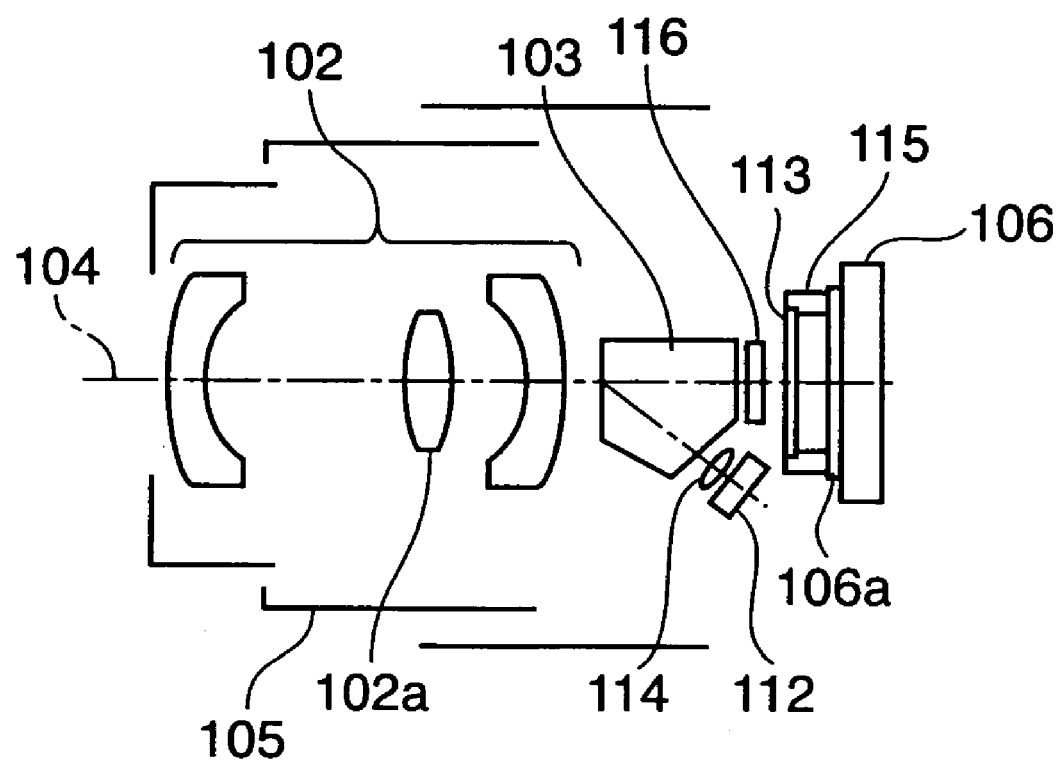
FIG. 3 is a sectional view showing the arrangement of a lens barrel portion of the digital camera.
Figure 4A:
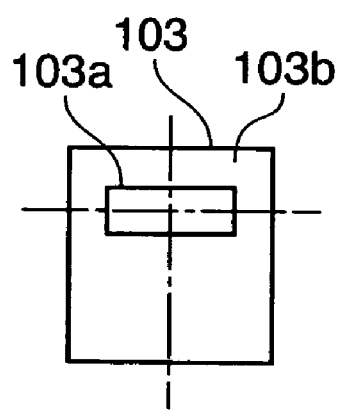
FIG. 4A is a front view of a beam splitter.
Figure 4B:
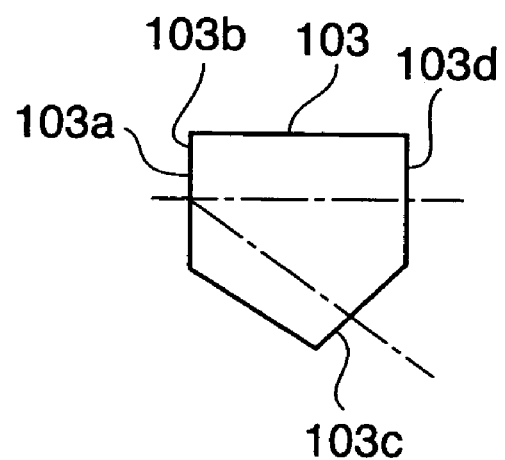
FIG. 4B is a side view of the beam splitter.

FIG. 3 is a sectional view showing the arrangement of a lens barrel portion of the digital camera, FIG. 4A is a front view of the beam splitter 103, and FIG. 4B is a side view of the beam splitter 103.

The beam splitter 103 and its peripheral portions will be explained in detail below using FIG. 3 and FIGS. 4A and 4B. The beam splitter 103 is located between lenses 102a and 102b (not shown) which form the photographing optical system 102. The lens 102a is the focusing lens, and is moved in the direction of an optical axis 104 to attain focus adjustment.

The CMOS light-receiving sensor 106 is laid out on a prospective imaging plane of the photographing optical system 102, and a cover glass 106a of the CMOS light-receiving sensor 106 is fixed via a seal member 115. With this arrangement, dust will never attach on the cover glass 106a of the CMOS light-receiving sensor 106, and dust may attach to the entrance surface of the lens 102b. Since the distance from the light-receiving surface of the CMOS light-receiving sensor 106 to a dust position is sufficiently large, nearly no dust attached to the entrance surface of the 102b will be printed on the screen.

Figure 5:
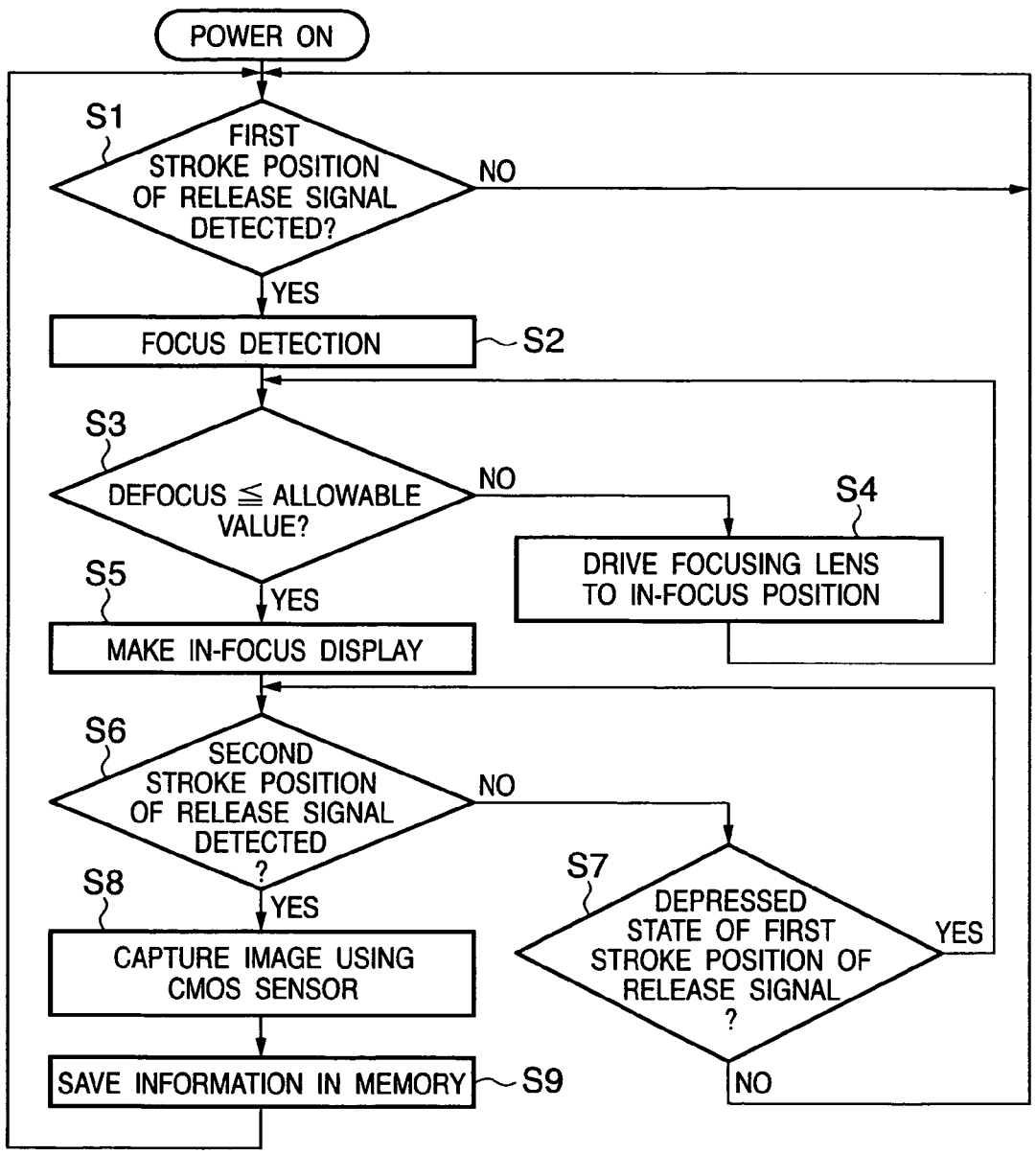
FIG. 5 is a flowchart showing an example of a schematic image capturing sequence of the digital camera.

FIG. 5 is a flowchart showing an example of a schematic image capturing sequence of the digital camera.

Referring to FIG. 5, upon power ON, the digital camera is set in an operation waiting state of the shutter release button 111, i.e., a release signal waiting state. Upon detection of depression of the shutter release button 111 to its first stroke position by the operation detection circuit 136 (YES in step S1), the AF control circuit 140 detects a focus (step S2). Next, the AF control circuit 140 checks if a defocus is equal to or lower than an allowable value (step S3). If the defocus is larger than the allowable value, the AF control circuit 140 drives the focusing lens to an in-focus position (step S4); otherwise, the AF control circuit 140 controls the information display circuit 142 to make in-focus display (step S5).

Upon detection of depression of the shutter release button 111 to its second stroke position by the operation detection circuit 136 (YES in step S6), image capturing processing using CMOS light-receiving sensor 106 (step S8) and save processing of information in the memory (step S9) are executed. After that, the flow returns to a release signal waiting state again (step S1). If the operation detection circuit 136 does not detect depression of the shutter release button 111 to its second stroke position (NO in step S6), it is checked if the shutter release button 111 is pressed to its first stroke position (step S7). If the shutter release button 111 is pressed to its first stroke position, the flow returns to step S6; otherwise, the flow returns to step S1.

The beam splitter 103 as a light beam splitting device will be described below.

The beam splitter 103 comprises a light splitting function surface 103a that can split a light beam depending on the directions of polarization. FIGS. 4A and 4B show an example of the light splitting function surface 103a which is formed as a polarization diffraction grating. A light entrance surface of the beam splitter 103 is formed by a surface 103b on which the light splitting function surface 103a is formed, and an exit surface of straight traveling light is formed on a surface 103d. The surfaces 103b and 103d are parallel to each other. Therefore, the beam splitter 103 serves as a parallel plate with respect to straight traveling light.

Figure 6:
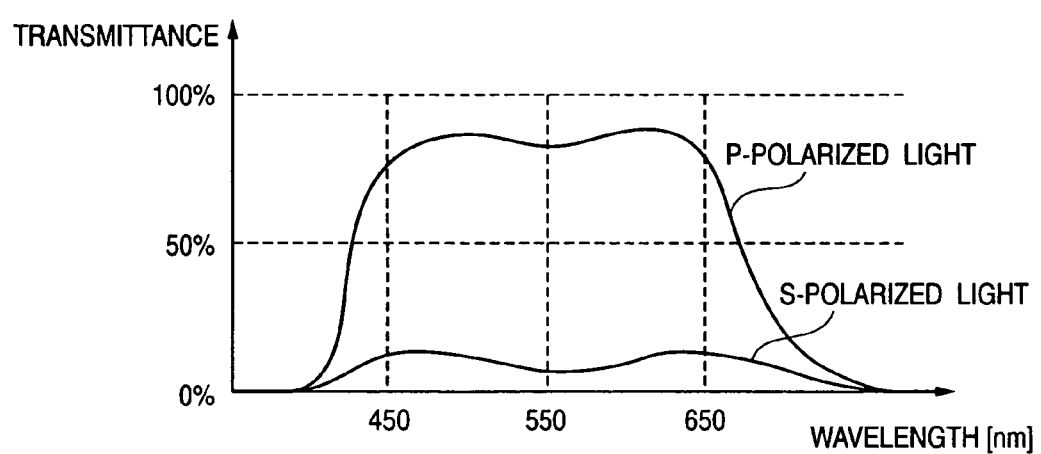
FIG. 6 is a graph showing an example of the spectral transmittance characteristics of a light splitting function surface of the beam splitter.

The light splitting function surface 103a of the beam splitter 103 is obtained by forming a diffraction grating type light polarizing plate described in, e.g., Japanese Patent Laid-Open No. 63-55501 on the surface of the beam splitter 103 so as to obtain desired optical characteristics. The spectral transmittance characteristics of the light splitting function surface 103a of the beam splitter 103 are as shown in FIG. 6, i.e., the surface 103a has a high transmittance to P-polarized light in the visible light range, and a low transmittance to S-polarized light in the visible light range. Light that enters from the surface 103b of the beam splitter 103 leaves from a surface 103c, and is guided to a focus detection device (focus detection sensor 112 and arithmetic circuit) as diffracted light of the first order.

A condenser lens (field lens) 114 which serves to condense a light beam used in focus detection is arranged at a position opposing the surface 103c of the beam splitter 103. Light transmitted through the condenser lens 114 becomes incident on the focus detection sensor 112, thus enabling the focus detection function.

The spectral characteristics of a light beam split by the beam splitter 103 are set to be substantially equal to those of straight traveling light, and this light beam enables the focus detection function. In the spectral characteristics of light that becomes incident on the focus detection sensor 112, those of diffracted light of the light splitting function surface 103a of the beam splitter 103 are dominant. However, when sufficient diffraction characteristics are assured, a transmittance approaches 50%, and high-precision focus detection can be attained using a light beam which has a sufficient light amount and is substantially equal to that which becomes incident on the image capturing surface of the CMOS light-receiving sensor 106.

Figure 7:
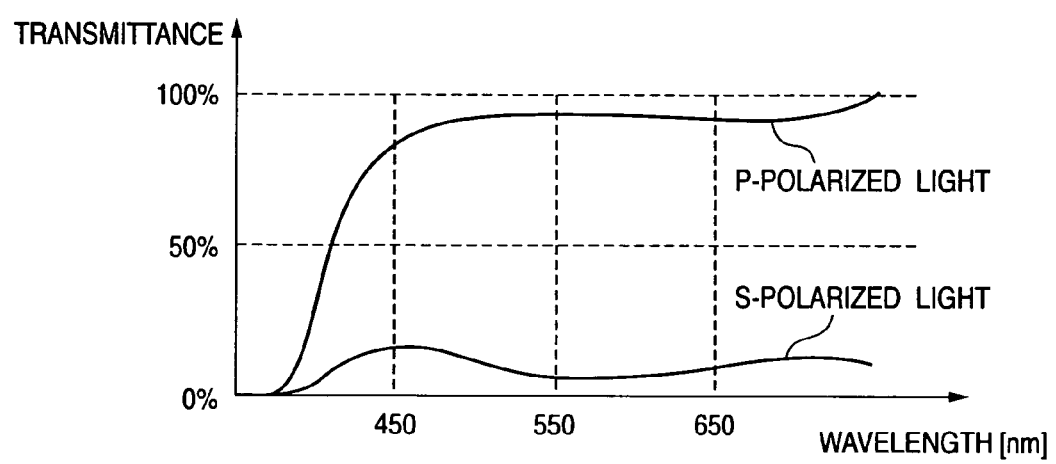
FIG. 7 is a graph showing an example of the spectral transmittance characteristics of a polarizing filter.

The so-called polarizing filter 116 is arranged between the beam splitter 103 and CMOS light-receiving sensor 106, and intercepts polarized light (S-polarized light in this case) diffracted by the light splitting function surface 103a of the beam splitter 103. FIG. 7 shows preferred spectral transmittance characteristics of the polarizing filter 116.

The focus detection sensor 112 will be described below.

Figure 8:
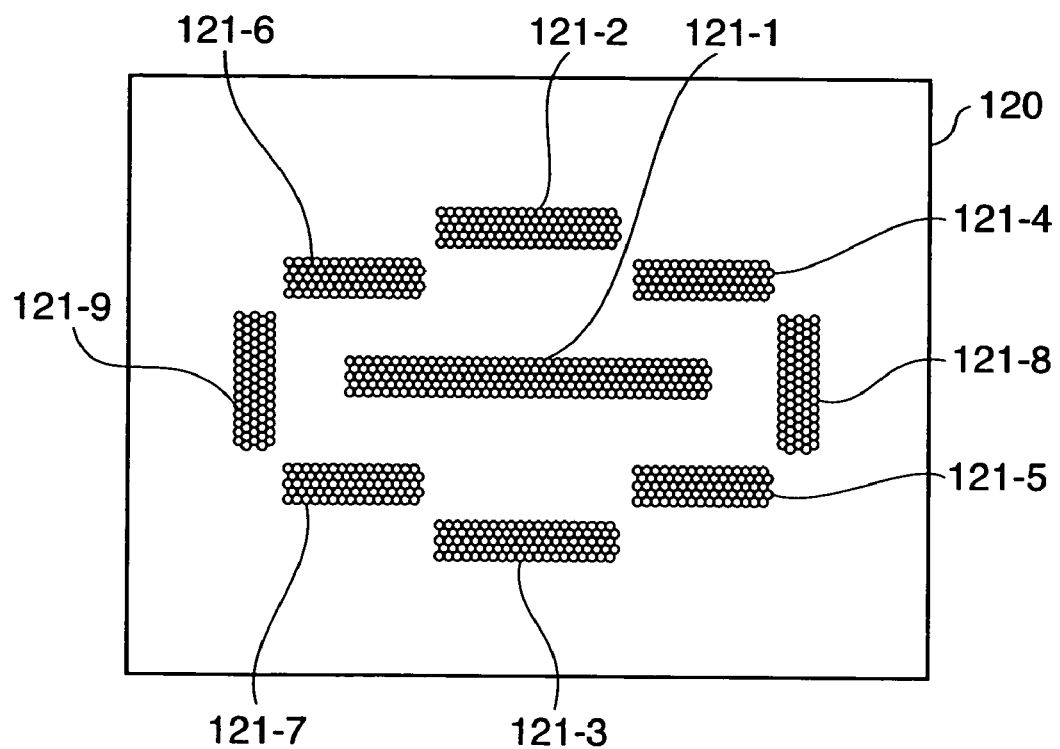
FIG. 8 is a view showing focus detection visual fields of a focus detection sensor.

FIG. 8 shows the focus detection visual fields for an embodiment of the focus detection sensor 112.

Referring to FIG. 8, reference numeral 120 denotes a viewfinder visual field which has an image capturing range of the digital camera as an observation range; and 121-1 to 121-9, focus detection visual fields. When the focus detection visual fields are set near the center of the image capturing range, a convenient digital camera is provided. Since the focus detection visual fields made up of vertical pixel arrays have sensitivity to the vertical luminance distribution, they allow focus detection to, e.g., a horizontal line. On the other hand, since the focus detection visual fields made up of horizontal pixel arrays have sensitivity to the horizontal luminance distribution, they allow focus detection to, e.g., a vertical line. The actual focus detection sensor 112 is arranged, as shown in FIG. 9.

Figure 9:
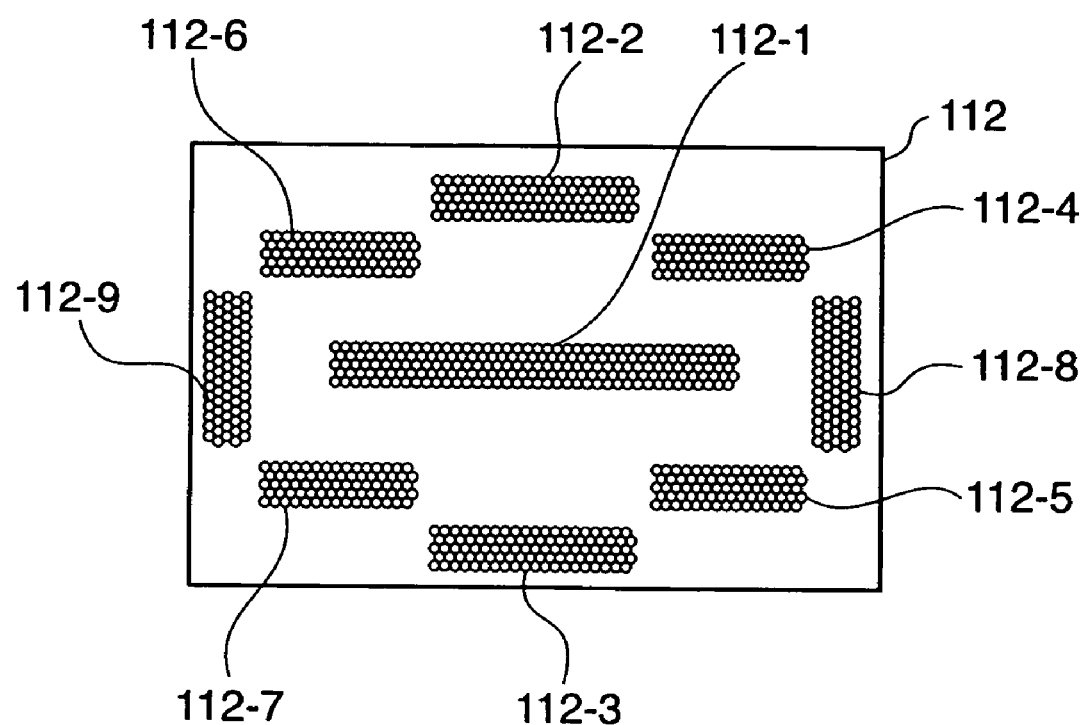
FIG. 9 is a plan view showing the arrangement of the focus detection sensor.

FIG. 9 is a plan view showing the arrangement of the focus detection sensor 112.

Referring to FIG. 9, reference numerals 112-1 to 112-9 denote pixel arrays which form the focus detection visual fields 121-1 to 121-9 shown in FIG. 8.

Figure 11A:
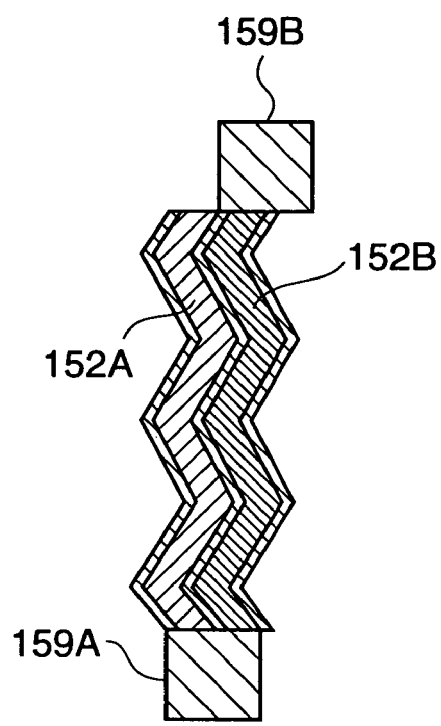
FIG. 11A is a plan view showing the arrangement of a photoelectric conversion unit per pixel of the focus detection sensor.
Figure 11B:
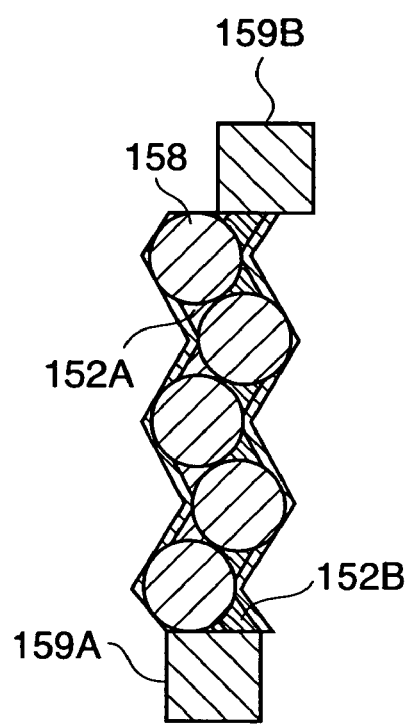
FIG. 11B is a plan view showing the arrangement per pixel of the focus detection sensor.

FIG. 10 is a sectional view showing the arrangement of a pixel unit of the focus detection sensor 112, FIG. 11A is a plan view showing the arrangement of a photoelectric conversion unit per pixel of the focus detection sensor 112, and FIG. 11B is a plan view showing the arrangement per pixel of the focus detection sensor 112.

In FIG. 10 and FIGS. 11A and 11B, light 160 enters the focus detection sensor 112 from the above in FIG. 10, and from a direction perpendicular to the plane of the page in FIGS. 11A and 11B. The focus detection sensor 112 is a CMOS sensor having on-chip type microlenses, and can specify an f-number (aperture value) of a focus detection light beam by the operations of the microlenses.

Reference numeral 151 denotes a silicon substrate; 152A and 152B, photoelectric conversion units of embedded photodiodes; 154, a first wiring layer which is formed of aluminum or copper and has light-shielding characteristics; and 155, a second wiring layer using aluminum or copper. Reference numeral 156 denotes an insulating interlayer film and passivation film formed of a silicon oxide film, hydrophobic porous silica, silicon oxynitride film, silicon nitride film, or the like; 158, microlenses; and 157, a planarizing layer for setting the distances from the second wiring layer 155 to the microlenses 158 with high precision. Reference numeral 155a denotes apertures of the second wiring layer 155.

The first and second wiring layers 154 and 155 are metal films having discretely formed apertures, and do not pass any visible light except for the apertures. The first and second wiring layers 154 and 155 have both an electrical function of enabling the focus detection sensor 112 and an optical function of controlling the angle characteristics of a received light beam. The planarizing layer 157 is formed by a method of curing a thermo-curing resin or ultraviolet-curing resin after it is spin-coated, or adhering a resin film.

Figure 12:
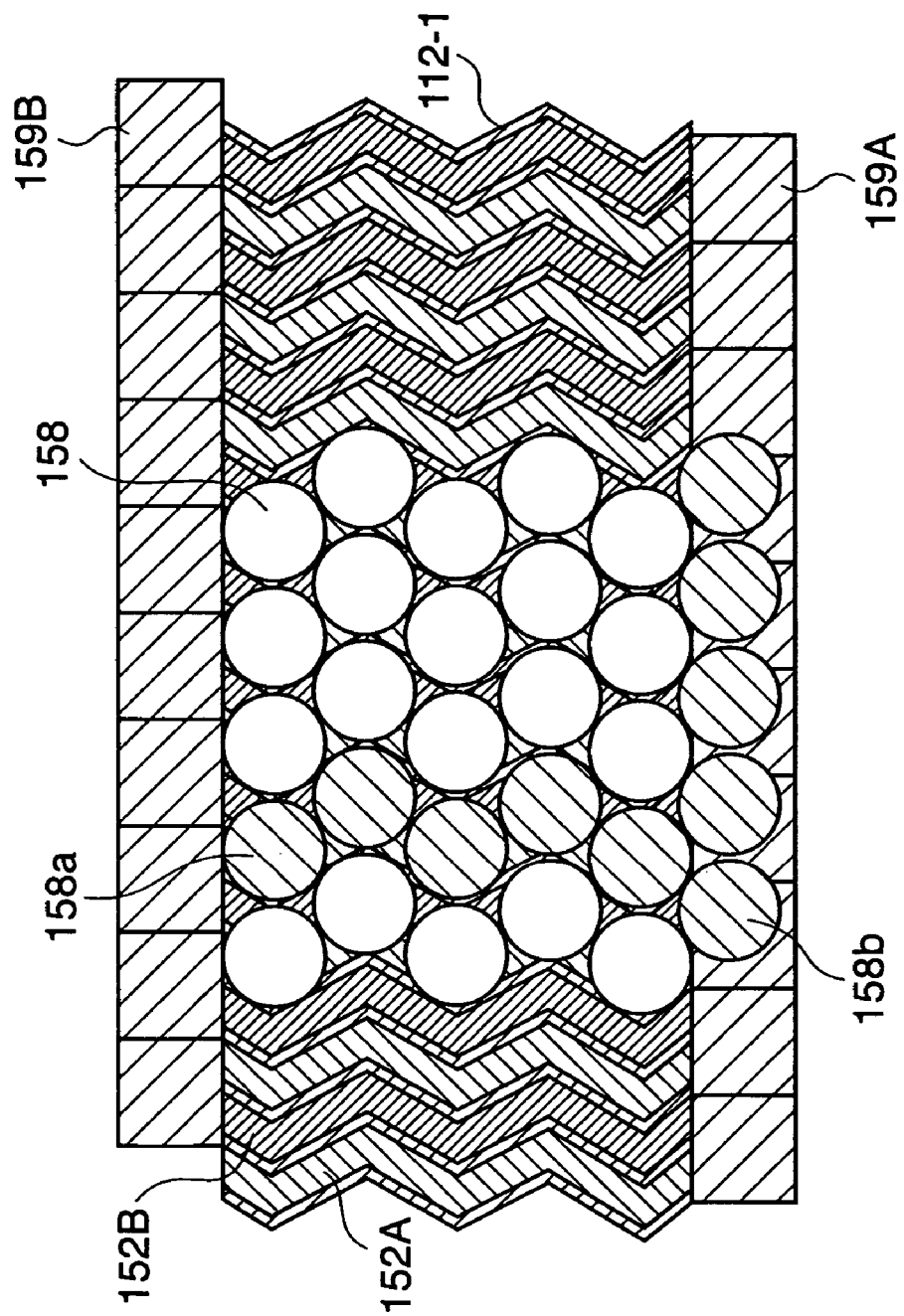
FIG. 12 is a plan view showing a state of a pixel array used in focus detection by coupling pixels shown in FIG. 11.
Figure 13:
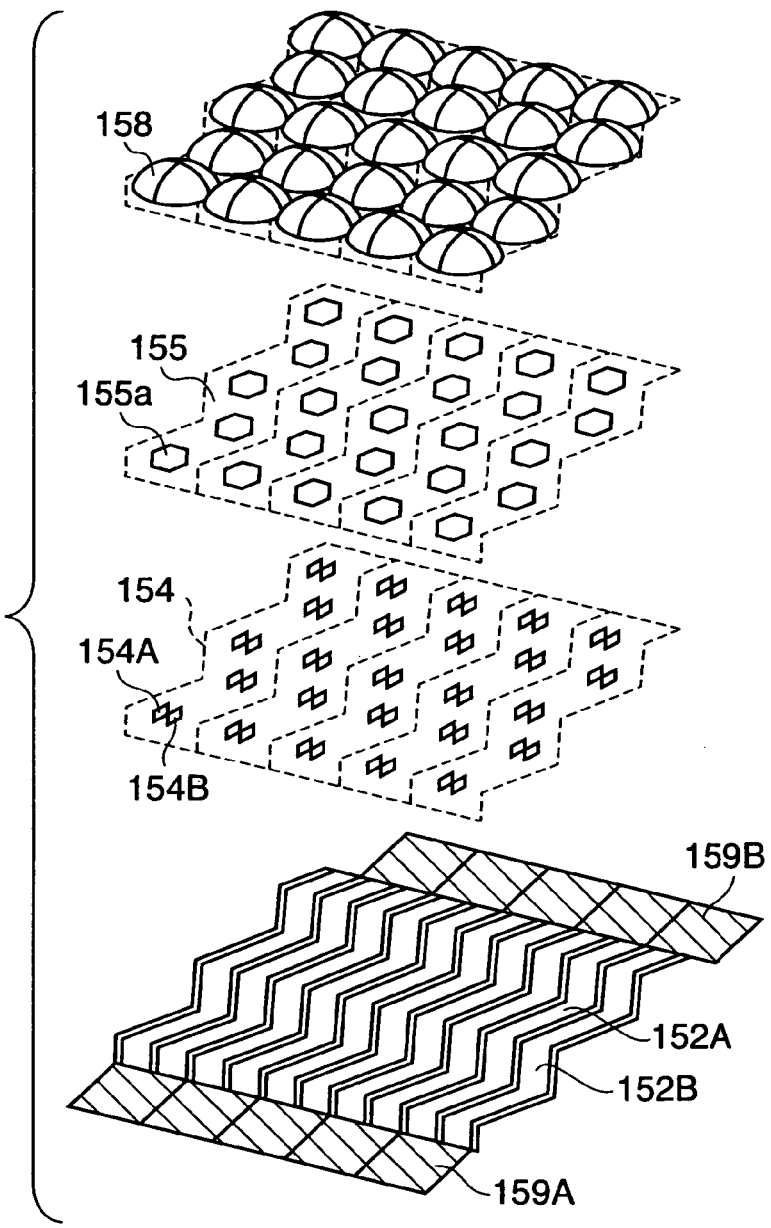
FIG. 13 is a perspective view showing a state of a pixel array used in focus detection by coupling pixels shown in FIG. 11.

FIGS. 12 and 13 are respectively a plan view and perspective view showing a state of a pixel array to be used in focus detection by coupling the pixels shown in FIGS. 11A and 11B.

In FIG. 12 of FIGS. 12 and 13, the microlenses 158A and 158B at two ends are not illustrated to recognize the positional relationship of the photoelectric conversion units 152A and 152B and microlenses 158, so that the photoelectric conversion units 152A and 152B can be seen. Also, in FIG. 13, the photoelectric conversion units 152A and 152B, first and second wiring layers 154 and 155, and microlenses 158 of building components are extracted, and are vertically exploded. In order to make a boundary per pixel clearly understandable, zigzag patterns of the photoelectric conversion units 152A and 152B are projected onto the first and second wiring layers 154 and 155 and are indicated by broken lines.

Figure 14:
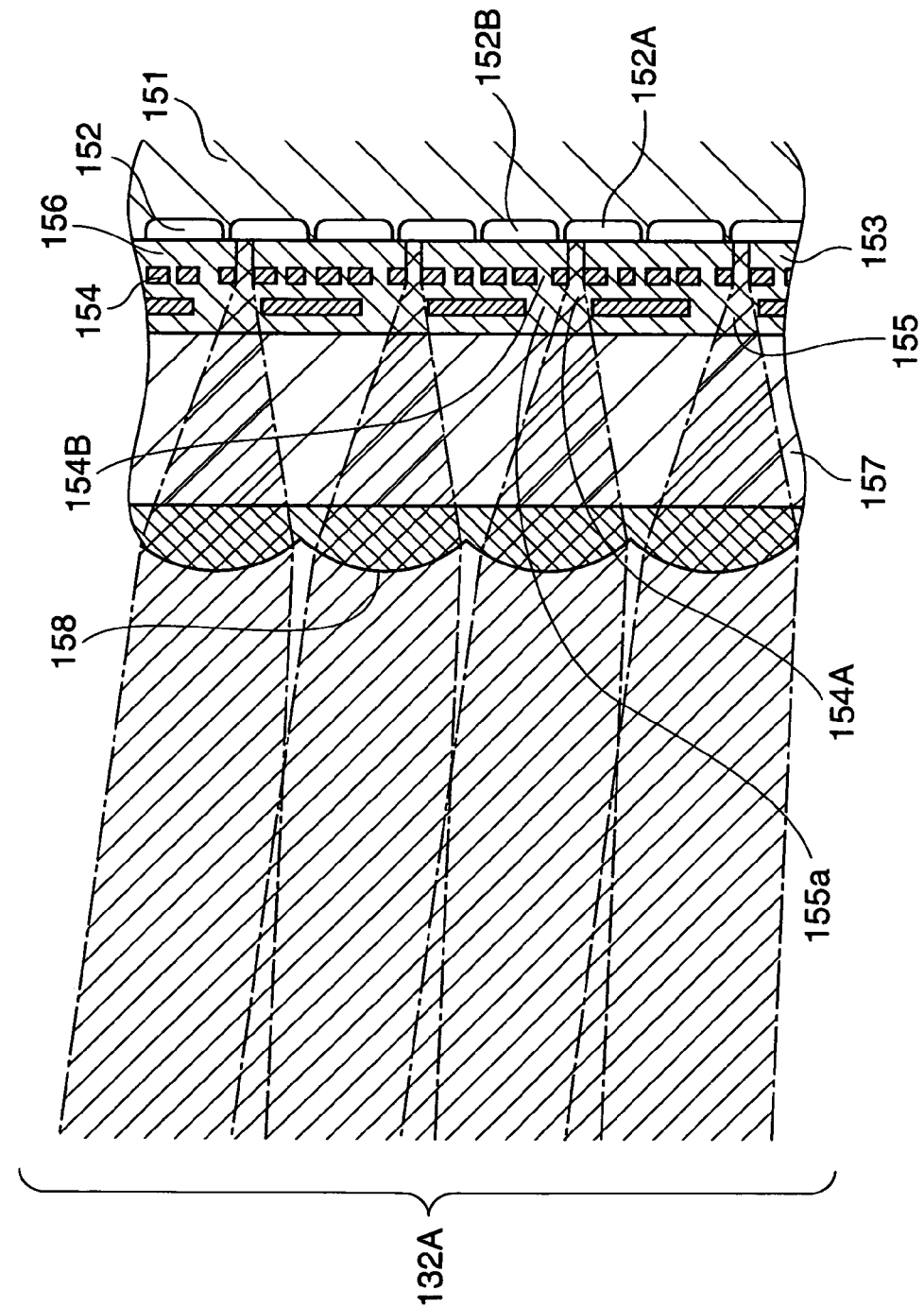
FIG. 14 is a partial sectional view of the focus detection visual fields shown in FIG. 8.
Figure 15:
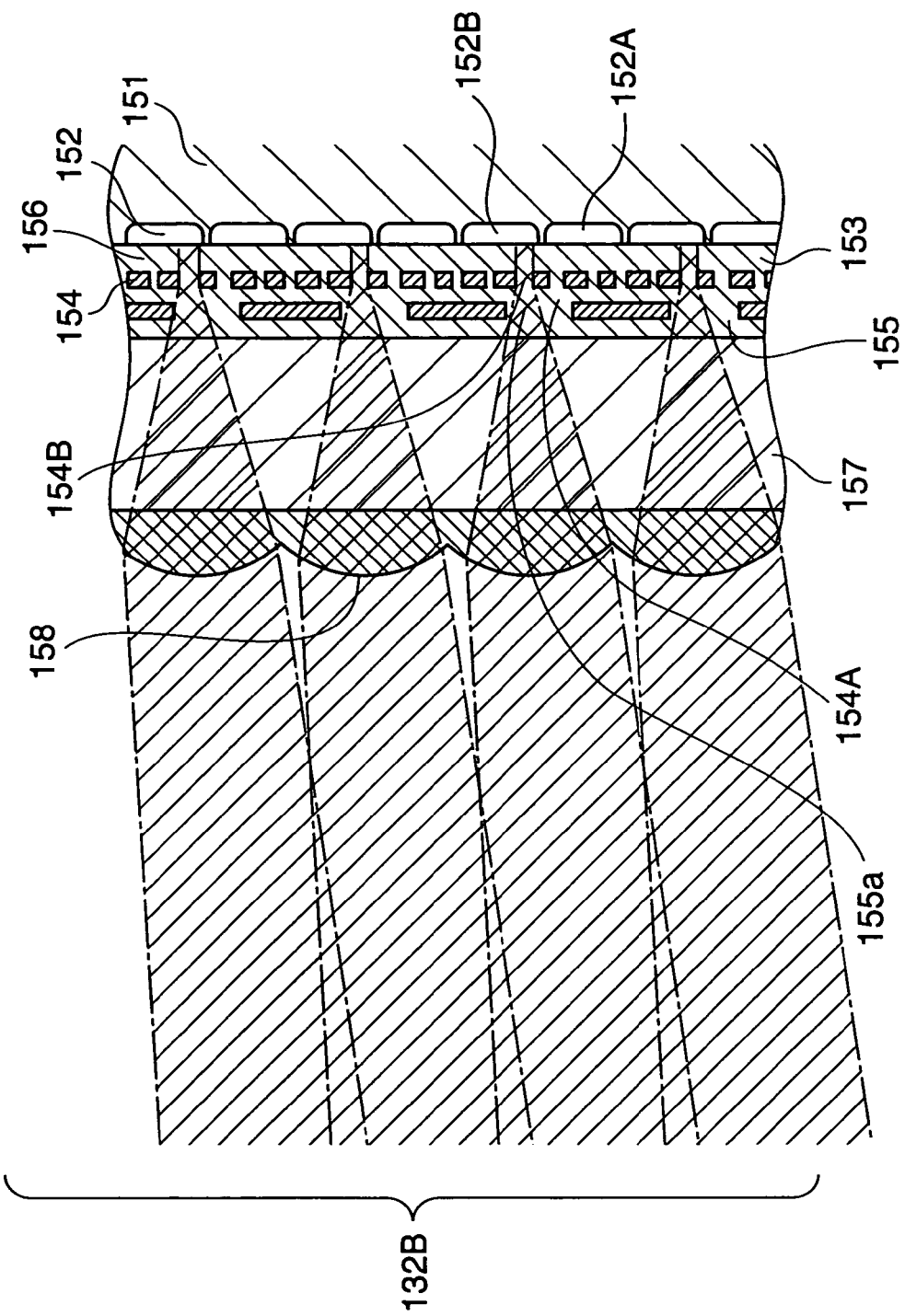
FIG. 15 is a partial sectional view of the focus detection visual fields shown in FIG. 8.

FIGS. 14 and 15 are partial sectional views of the focus detection visual field 121-1 shown in FIG. 8.

Referring to FIGS. 14 and 15, since the microlenses 158 inversely project apertures 154A and 154B of the first wiring layer 154 to the exit pupil of the photographing optical system 102, the fact that a light beam 132A can pass through the apertures 154A of the first wiring layer 154 is equivalent to the fact that the light beam 132A emerges from the inversely projected images of the apertures 154A of the first wiring layer 154, as shown in FIG. 14. Likewise, the fact that a light beam 132B can pass through the apertures 154B of the first wiring layer 154 is equivalent to the fact that the light beam 132B emerges from the inversely projected images of the apertures 154B of the first wiring layer 154, as shown in FIG. 15.

Therefore, light rays which enter the focus detection sensor 112 from positions other than the inversely projected images of the apertures 154A and 154B of the first wiring layer 154 are inevitably blocked by the first or second wiring layer 154 or 155, and cannot reach the photoelectric conversion units 152A and 152B, i.e., never undergo photoelectric conversion.

Between an output signal waveform obtained by arranging output signals from the photoelectric conversion units 152A and that obtained by arranging output signals from the photoelectric conversion units 152B for a pixel array which forms one focus detection visual field, relatively horizontally shifted states are observed in accordance with the focusing state of an object image formed on the focus detection visual field by the photographing optical system 102. This is because a light beam passes through different regions on the exit pupil of the photographing optical system 102 in correspondence with the output signal waveform obtained by arranging output signals from the photoelectric conversion units 152A and that obtained by arranging output signals from the photoelectric conversion units 152B. The principle of focus detection is as follows. That is, since the shift directions of the output signal waveforms are reversed in the pre- and post-focus states, the phase difference (shift amount) is detected as well as its direction by a method of, e.g., correlation arithmetic operations or the like.

Figure 16:
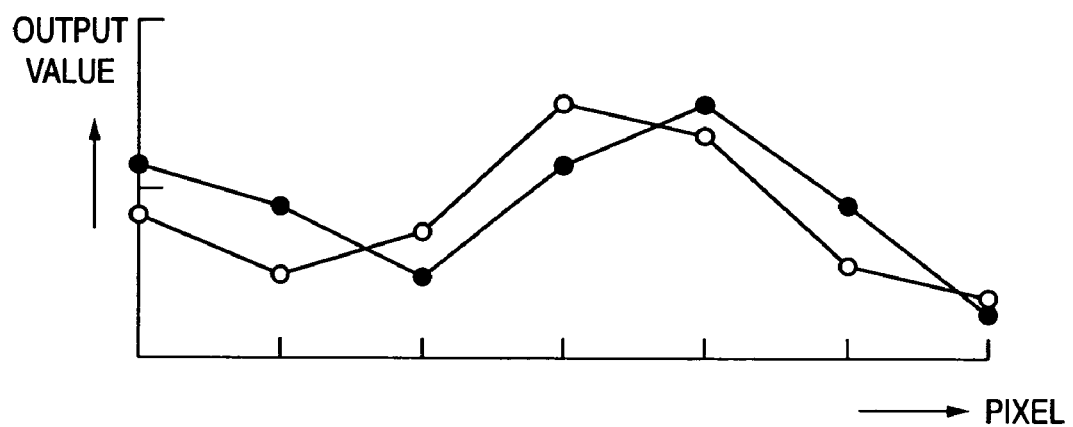
FIG. 16 is a chart showing the output signal waveforms of the focus detection sensor input to an AF control circuit (out-of-focus state)
Figure 17:
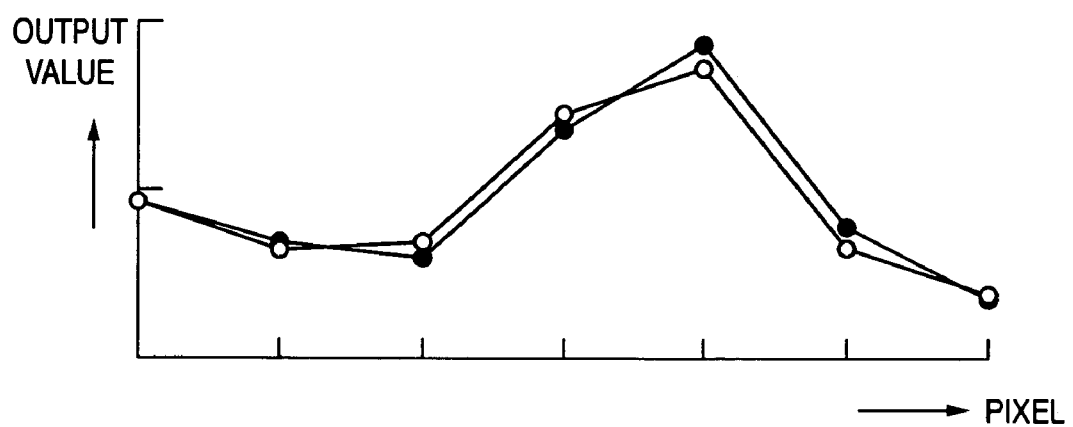
FIG. 17 is a chart showing the output signal waveforms of the focus detection sensor input to the AF control circuit (in-focus state)

FIGS. 16 and 17 are graphs showing the output signal waveforms in out-of-focus and in-focus states of the focus detection sensor 112, which are input to the AF control circuit 140.

In FIGS. 16 and 17, the abscissa plots an array of pixels, and the ordinate plots an output value. FIG. 16 shows the output signal waveform in an out-of-focus state on an object image, and FIG. 17 shows the output signal waveform in an in-focus state on an object image.

In this manner, in-focus detection can be made by checking the identity of a pair of signals. Furthermore, by detecting the phase difference by a known method using correlation arithmetic operation, e.g., a method disclosed in Japanese Patent Publication No. 05-088445, a defocus amount can be obtained. When the obtained defocus amount is converted into an amount for driving the focusing lens of the photographing optical system 102, auto focus adjustment can be attained. Since the amount for driving the focusing lens can be detected in advance, a lens drive operation to an in-focus position is normally performed substantially once, thus allowing very high-speed focus adjustment.

Figure 18:
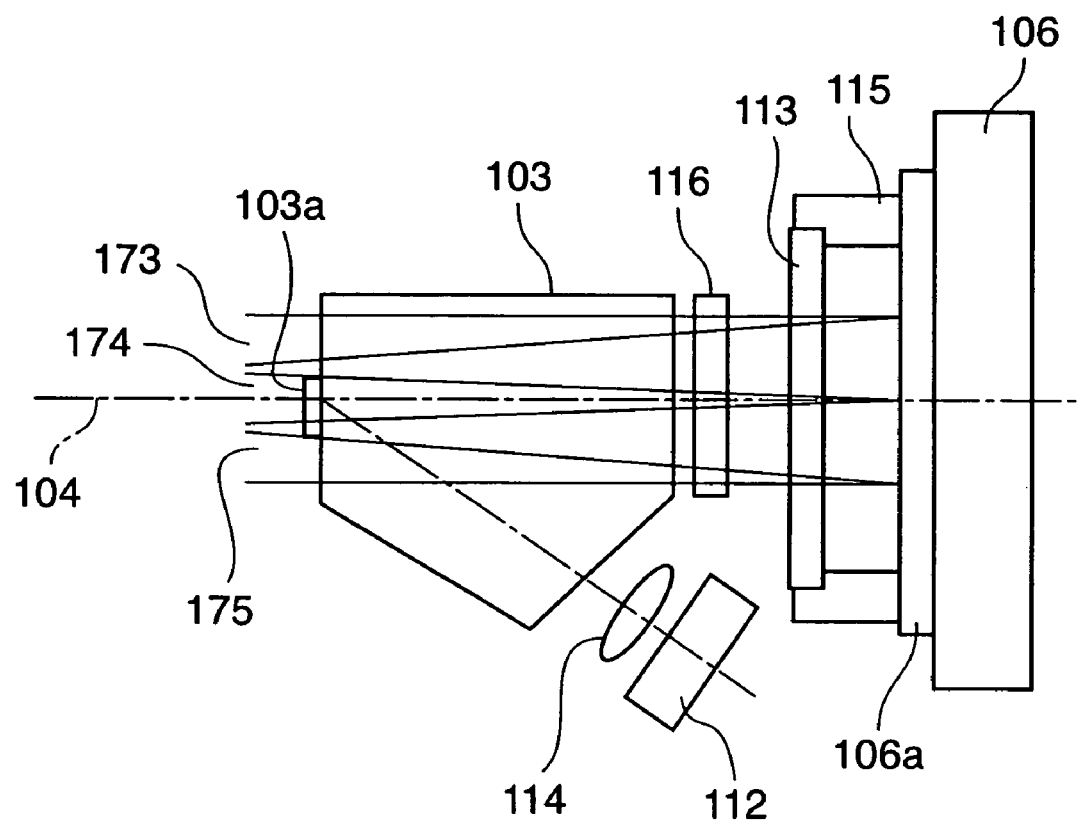
FIG. 18 is a view showing actual photographing light beams.

FIG. 18 shows actual photographing light beams.

Referring to FIG. 18, reference numeral 173 denotes a photographing light beam which becomes incident on the upper end portion of the CMOS light-receiving sensor 106; 174, a photographing light beam which becomes incident on the central portion of the CMOS light-receiving sensor 106; and 175, a photographing light beam which becomes incident on the lower end portion of the CMOS light-receiving sensor 106. Note that a range denoted by 103a in FIG. 18 and FIG. 22 (to be described later) indicates the formation range of the aforementioned diffraction grating type polarizing plate on the surface of the beam splitter 103.

Since the photographing light beam 174 passes through the light splitting function surface 103a of the beam splitter 103, it becomes light having an intensity distribution expressed by the product of the spectral transmission characteristics of the light splitting function surface 103a described using FIG. 6, the spectral intensity characteristics of an object, and the polarizing filter 116 described using FIG. 7, at the exit side of the beam splitter 103.

Since the photographing light beams 173 and 175 pass through the polarizing filter 116, they become light having an intensity distribution expressed by the product of the spectral transmission characteristics of the polarizing filter 116 described using FIG. 7 and the spectral intensity characteristics of an object.

Figure 19A:
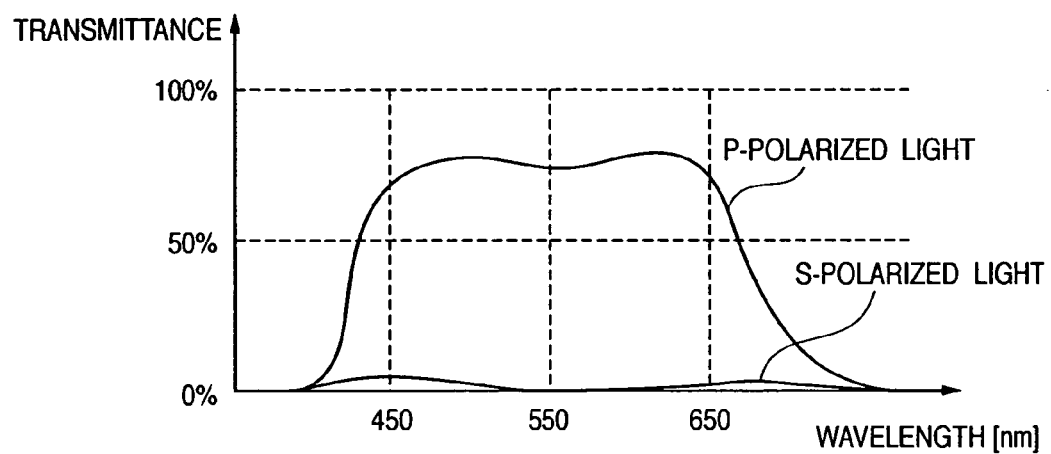
FIG. 19A is a graph showing an example of the spectral transmittance characteristics of a light beam 174 shown in FIG. 18.
Figure 19B:
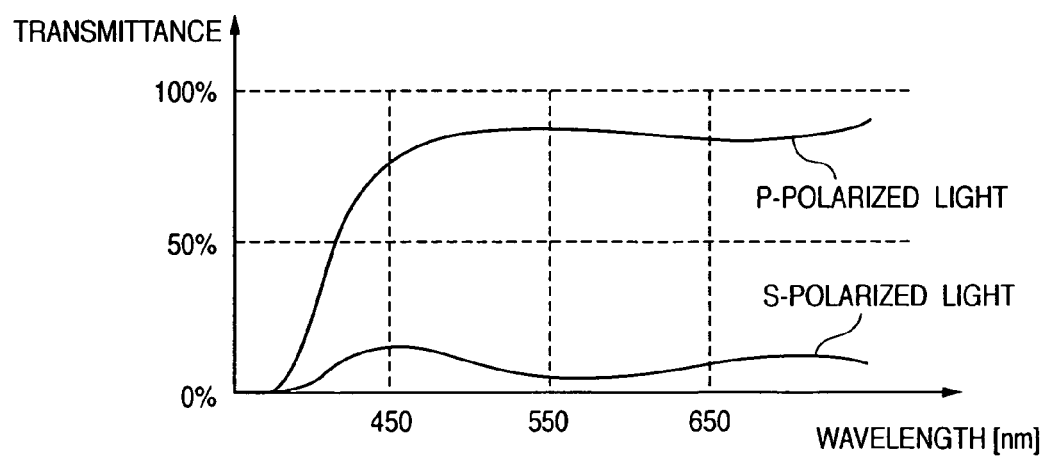
FIG. 19B is a graph showing an example of the spectral transmittance characteristics of light beams 173 and 175 shown in FIG. 18.

Since a polarized light component reflected by the light splitting function surface 103a of the beam splitter 103 is removed by the polarizing filter 116, substantially no differences are produced between the spectral transmittances of the photographing light beams 173 and 175 and the photographing light beam 174, as shown in the graphs of spectral transmittance characteristics in FIGS. 19A and 19B.

As described above, nearly equal transmittances can be set for a portion where the light splitting function surface 103a formed as the polarization diffraction grating exists on the beam splitter 103 and a portion where it does not exist. Hence, a preferred image can be obtained independently of the masking precision of the polarization diffraction grating. When an optical image of a nearly even luminance surface is captured by the CMOS light-receiving sensor 106, an image 180 with nearly even brightness is obtained, as shown in FIG. 20, and a photographing result which is the same as a normal image is obtained without any particular luminance nonuniformity.

Figure 21:
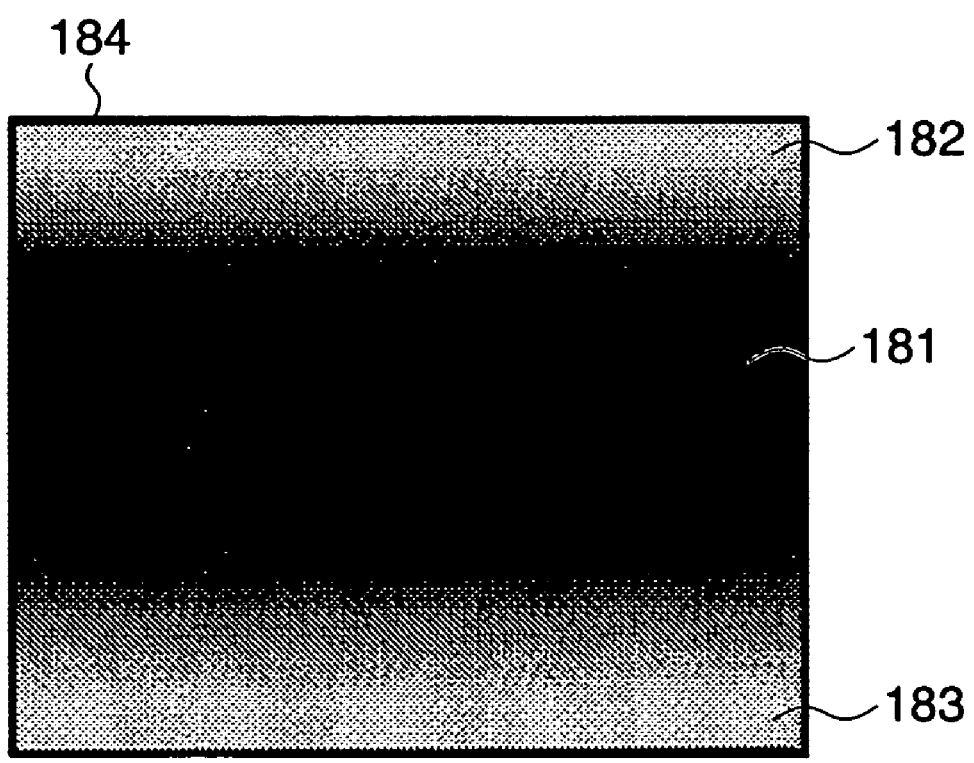
FIG. 21 shows the degree of occurrence of luminance nonuniformity on an image.

If neither the light splitting function surface 103a formed as the polarization diffraction grating on the beam splitter 103 nor the polarizing filter 116 are used, and if a portion where no light splitting function surface 103a exists has a transmittance close to 100% upon projecting a light beam onto a surface perpendicular to the optical axis, an image of an object captured by the CMOS light-receiving sensor 106 becomes like an image 184 on which upper and lower bright regions 182 and 183 are formed to sandwich a central dark region 181, as shown in FIG. 21. Hence, the effect of adjusting the transmittance using the light splitting function surface 103a formed as polarization diffraction grating and the polarizing filter 116 is very large.

Figure 22:
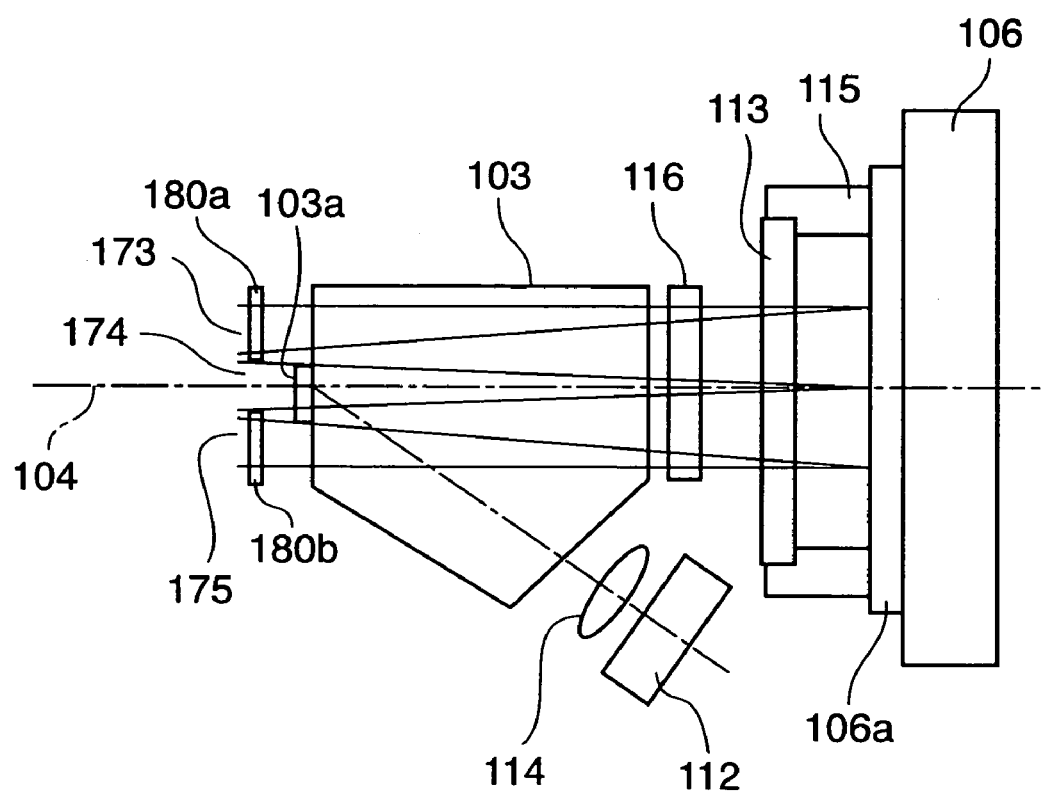
FIG. 22 is a view showing an example in which extinction parts used to obtain uniform luminance are arranged in front of the beam splitter.

A case will be examined below wherein extinction parts 180a and 180b having the same transmission characteristics as those of the light splitting function surface 103a are provided to portions where the light splitting function surface 103a does not exist on the beam splitter 103, as shown in FIG. 22, upon projecting a light beam onto a surface of the beam splitter 103, which is perpendicular to the optical axis of the photographing optical system 102, so as to uniform the luminance level of the image capturing range.

FIG. 22 is a view showing an example in which the extinction parts 180a and 180b used to the uniform the luminance level of the image capturing range are arranged in front of the beam splitter 103.

In FIG. 22, assume that the transmission characteristics of the extinction parts 180a and 180b are substantially the same as the spectral transmission characteristics of the light splitting function surface 103a of the beam splitter 103.

Figure 23A:
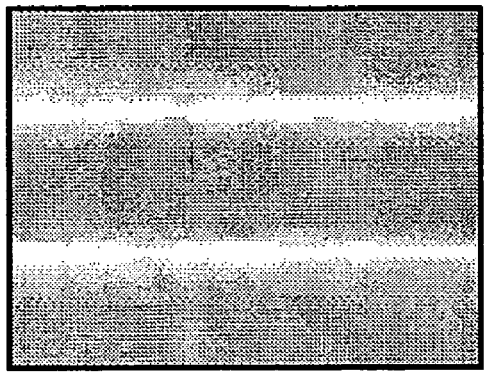
FIG. 23A shows luminance nonuniformity when gaps are formed between the extinction parts and light splitting function surface.
Figure 23B:
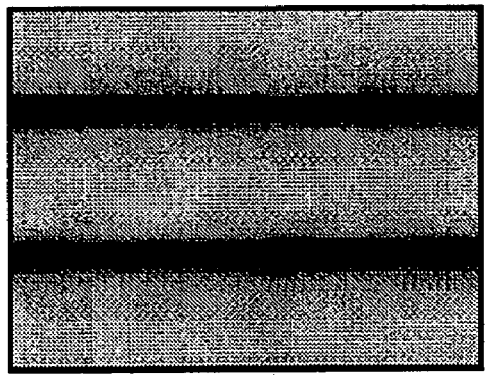
FIG. 23B shows luminance nonuniformity when overlapping portions are formed between the extinction parts and light splitting function surface.

In this case, the extinction parts 180a and 180b and the light splitting function surface 103a must be aligned with very high precision. That is, when gaps or overlapping portions are formed between the extinction parts 180a and 180b and the light splitting function surface 103a, an image which does not have uniform luminance on the image capturing range, and has impaired quality is obtained, as shown in FIG. 23A or 23B. The influence on an image becomes more conspicuous as the light splitting function surface 103a is brought closer to the imaging surface so as to attain a size reduction of the apparatus. In general, it is not easy to precisely assemble the extinction parts 180a and 180b and the light splitting function surface 103a without influencing an image due to their manufacturing and assembling errors.

On the other hand, according to this embodiment, since the shape and positional precision of the light splitting function surface 103a do not influence luminance of an image, and the polarizing filter 116 need only be large enough to cover the entire light beam used in image capturing, neither high assembling precision nor high parts precision are required. The effect of determining the transmittance of the entire photographing light beam using the light splitting function surface 103a formed as the polarization diffraction grating and the polarizing filter 116 is very large.

As described above, according to this embodiment, the following effects can be simultaneously achieved: when a light beam coming from the photographing optical system 102 is split by the beam splitter 103, the spectral characteristics of the split light beam are set to be substantially equal to those of straight traveling light and the auto focus detection function is enabled by the split light with a sufficient light amount; an increase in size of the digital camera by the light splitting structure can be prevented; and a high-quality image is obtained based on light which goes straight through the beam splitter 103.

Second Embodiment

The second embodiment of the present invention is different from the aforementioned first embodiment in the following point. Since other elements of this embodiment are the same as corresponding ones of the first embodiment (FIGS. 1 and 2, and the like) described above, a description thereof will be omitted.

Figure 24:
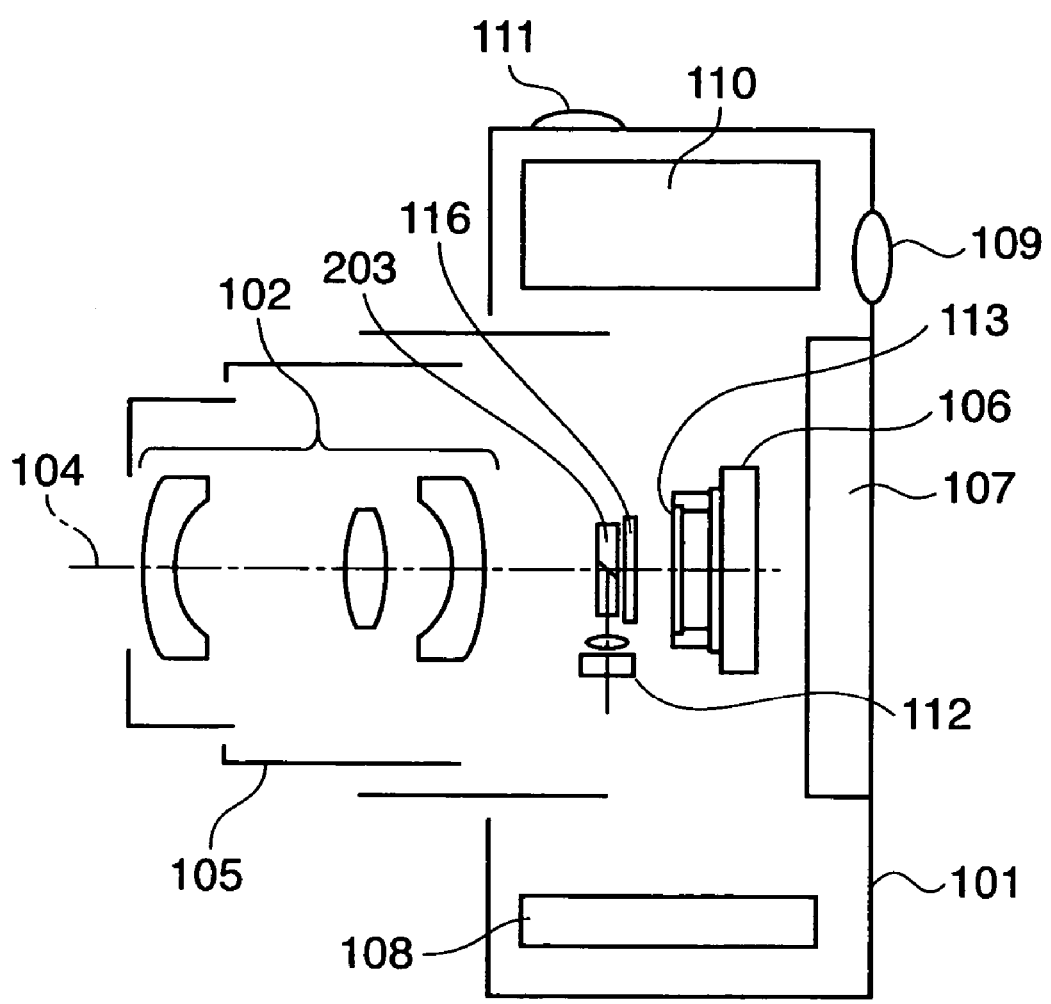
FIG. 24 is a sectional view showing the arrangement of a digital camera as an image capturing apparatus according to the second embodiment of the present invention.
Figure 25:
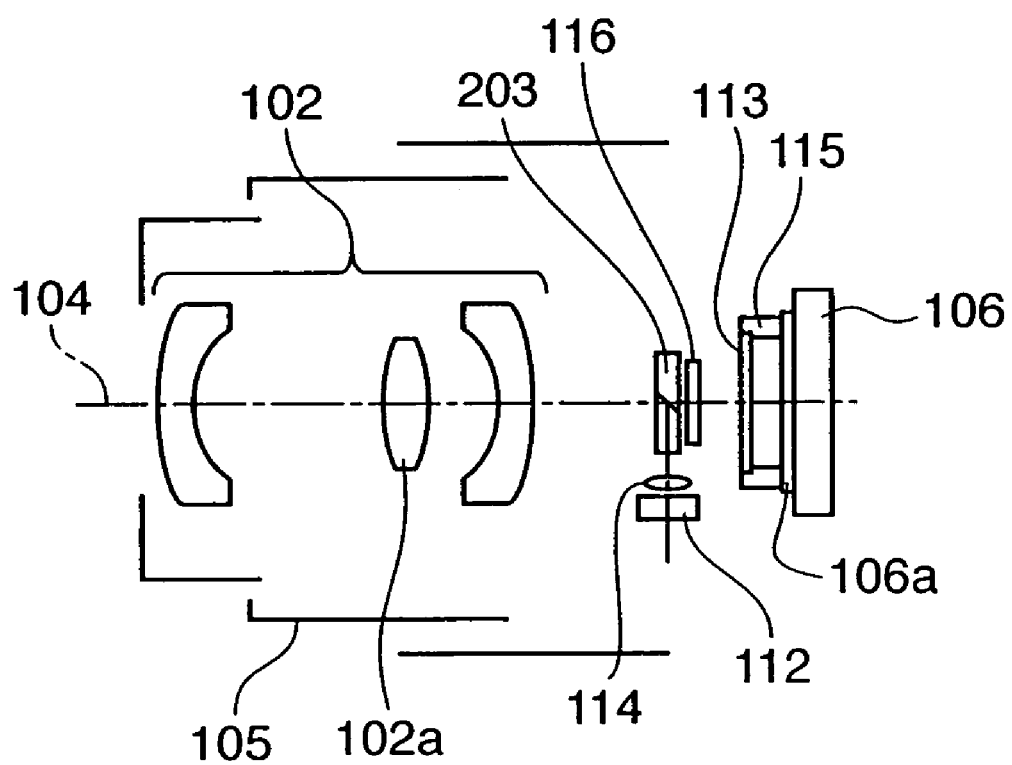
FIG. 25 is a sectional view showing the arrangement of a lens barrel portion of the digital camera.

FIG. 24 is a sectional view showing the arrangement of a digital camera as an image capturing apparatus according to this embodiment, and FIG. 25 is a sectional view showing the arrangement of a lens barrel portion of the digital camera.

Referring to FIGS. 24 and 25, reference numeral 203 denotes a beam splitter which serves as a light beam splitting device, and comprises prisms. The same reference numerals in FIGS. 24 and 25 denote the same elements having the same functions as those in FIG. 1, and a description thereof will be omitted. As can be seen from FIGS. 24 and 25, the difference between this embodiment and the first embodiment lies in the structure of the beam splitter 203, and a description will be given focused on this difference.

Figure 26A:
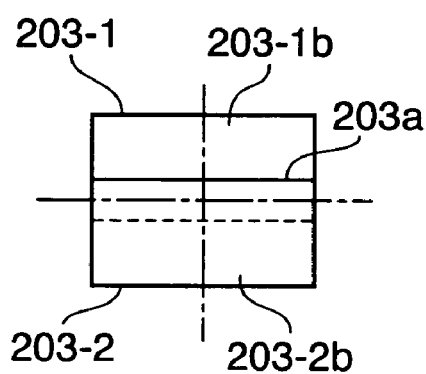
FIG. 26A is a front view of a beam splitter.
Figure 26B:
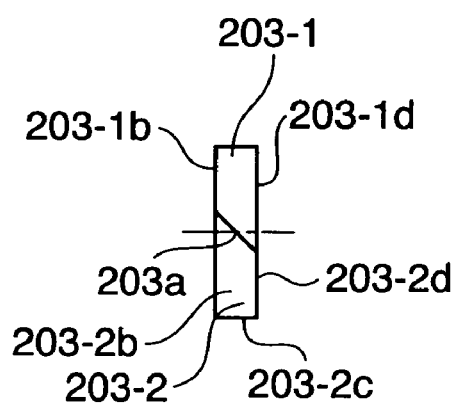
FIG. 26B is a side view of the beam splitter.

FIG. 26A is a front view of the beam splitter 203, and FIG. 26B is a side view of the beam splitter 203.

The light splitting function of the beam splitter 203 will be described below using FIGS. 26A and 26B. The beam splitter 203 is formed by cementing two prisms 203-1 and 203-2 at a light splitting function surface 203a. A light entrance surface of the beam splitter 203 is defined by a surface 203-1b of the prism 203-1 and a surface 203-2b of the prism 203-2, and an exit surface of straight traveling light is defined by a surface 203-1d of the prism 203-1 and a surface 203-2d of the prism 203-2.

There are no gap between the surface 203-1b of the prism 203-1 and the surface 203-2b of the prism 203-2, and no gap between the surface 203-1d of the prism 203-1 and the surface 203-2d of the prism 203-2. Also, the surfaces 203-1b and 203-1d of the prism 203-1 are parallel to each other, and the surfaces 203-2b and 203-2d of the prism 203-2 are parallel to each other. Therefore, the beam splitter 203 serves as a parallel plate with respect to straight traveling light.

The surface 203-1b of the prism 203-1 and the light splitting function surface 203a have different tilt angles, and the surface 203-2d of the prism 203-2 and the light splitting function surface 203a have different tilt angles. The surface 203-1b of the prism 203-1 and the light splitting function surface 203a intersect each other, and the surface 203-2d of the prism 203-2 and the light splitting function surface 203a intersect each other.

Of a light beam which enters the beam splitter 203 from the light entrance surface defined by the surface 203-1b of the prism 203-1 and the surface 203-2b of the prism 203-2, a light beam reflected by the light splitting function surface 203a leaves from a surface 203-2c. Note that the light splitting function surface 203a may be formed on either the prism 203-1 or 203-2.

Since the beam splitter 203 is formed of the prisms, it becomes easy to manufacture the beam splitter 203 and the thickness in the optical axis direction can be reduced compared to the first embodiment, thus contributing to a size reduction of the apparatus. Since the light splitting function surface 203a is set to make about 45° with the optical axis 104, as shown in FIG. 25, each prism can have a simple shape, thus attaining a cost reduction and improving the working precision.

Assume that the spectral transmittance characteristics of the light splitting function surface 203a of the beam splitter 203 are the same as the example of the spectral transmittance characteristics of the light splitting function surface 103a of the beam splitter 103 shown in FIG. 6. Also, the spectral transmittance characteristics of the polarizing filter 116 which is arranged between the beam splitter 203 and CMOS light-receiving sensor 106 are equivalent to the spectral transmittance characteristics shown in FIG. 7.

As can be apparent from the above description of the first embodiment, in this embodiment as well, substantially the same luminance levels can be set on a portion where the light splitting function surface 203a exists and a portion where it does not exist, and an image to be captured is not influenced.

Figure 27:
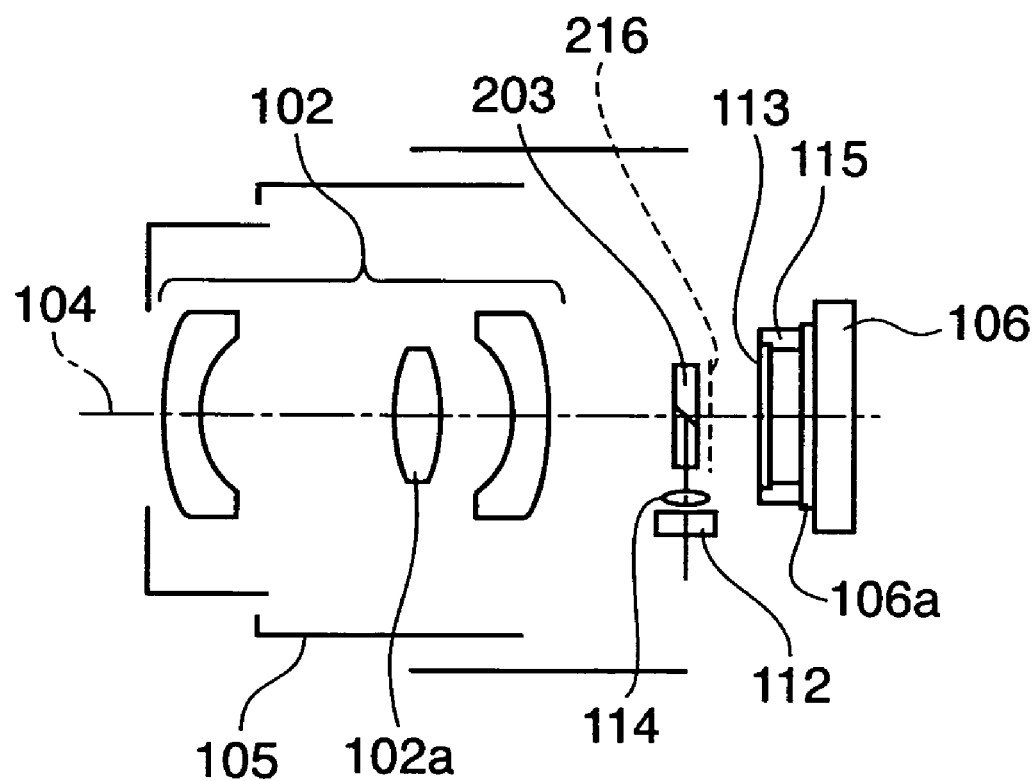
FIG. 27 is a sectional view showing the arrangement of a lens barrel portion of the digital camera.

As a modification of this embodiment, FIG. 27 and FIGS. 28A and 28B show an example wherein a polarizing filter as an extinction device arranged between the beam splitter 203 and the imaging plane of the CMOS light-receiving sensor 106 is arranged on the exit surface of the beam splitter 203.

FIG. 27 is a sectional view showing the arrangement of a lens barrel portion of the digital camera, FIG. 28A is a front view of the beam splitter 203, and FIG. 28B is a side view of the beam splitter 203.

In FIG. 27 and FIGS. 28A and 28B, a polarizing filter (extinction device) 216 that absorbs the same polarized light components as a light beam reflected by the light splitting function surface 203a is arranged on the surfaces 203-1d and 203-2d which serve as the exit surface of the beam splitter 203. Using the present invention, cost and size reductions of the apparatus can be attained by further decreasing the number of parts. In the example of FIGS. 26 and 27, a polarizing filter used as an extinction device is formed on the polarization beam splitter. Also, the above example can be applied to an optical system using a polarization diffraction grating.

As described above, this embodiment can contribute to a further size reduction and cost reduction of the apparatus without losing the effect of attaining uniform luminance on the CMOS light-receiving sensor 106 by a simple arrangement.

Third Embodiment

The third embodiment of the present invention is different from the aforementioned first embodiment in the following point. Since other elements of this embodiment are the same as corresponding ones of the first embodiment (FIGS. 1 and 2, and the like) described above, a description thereof will be omitted.

Figure 29:
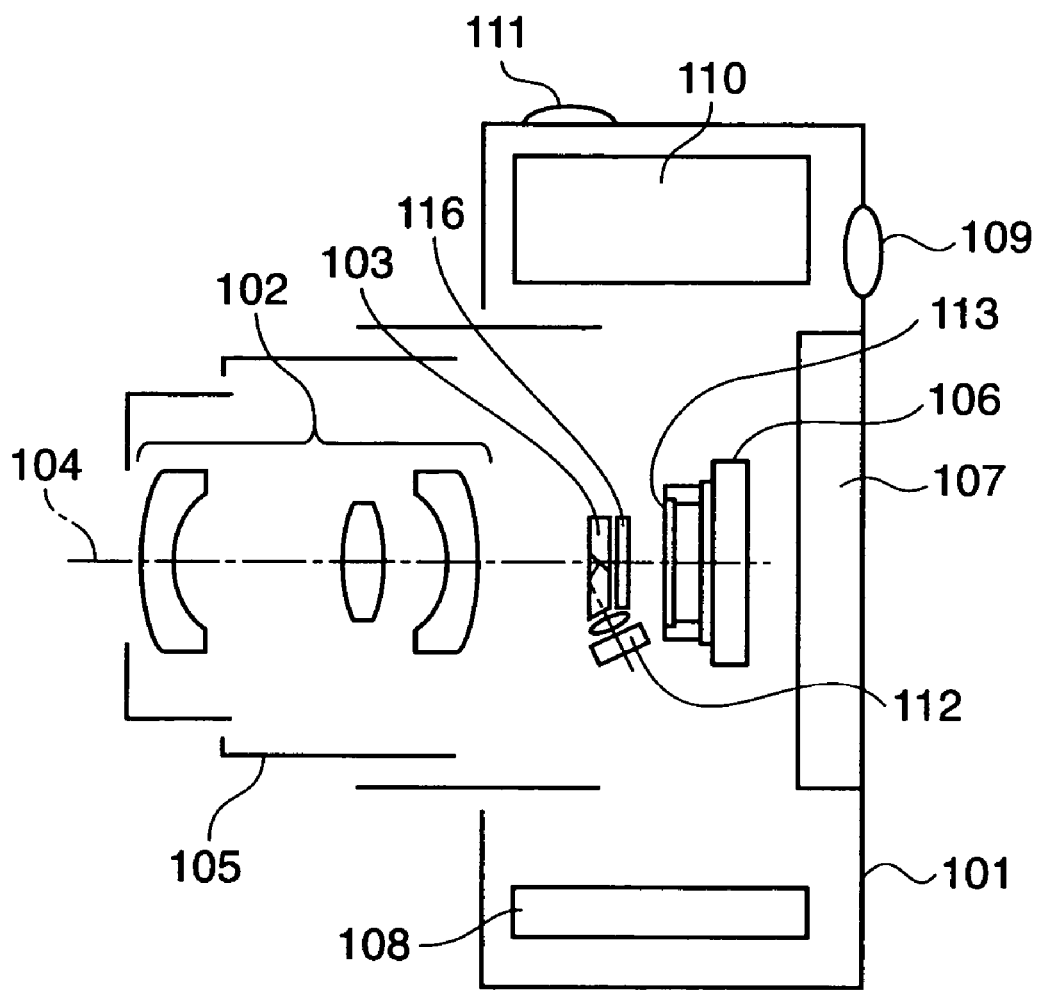
FIG. 29 is a sectional view showing the arrangement of a digital camera as an image capturing apparatus according to the third embodiment of the present invention.
Figure 30:
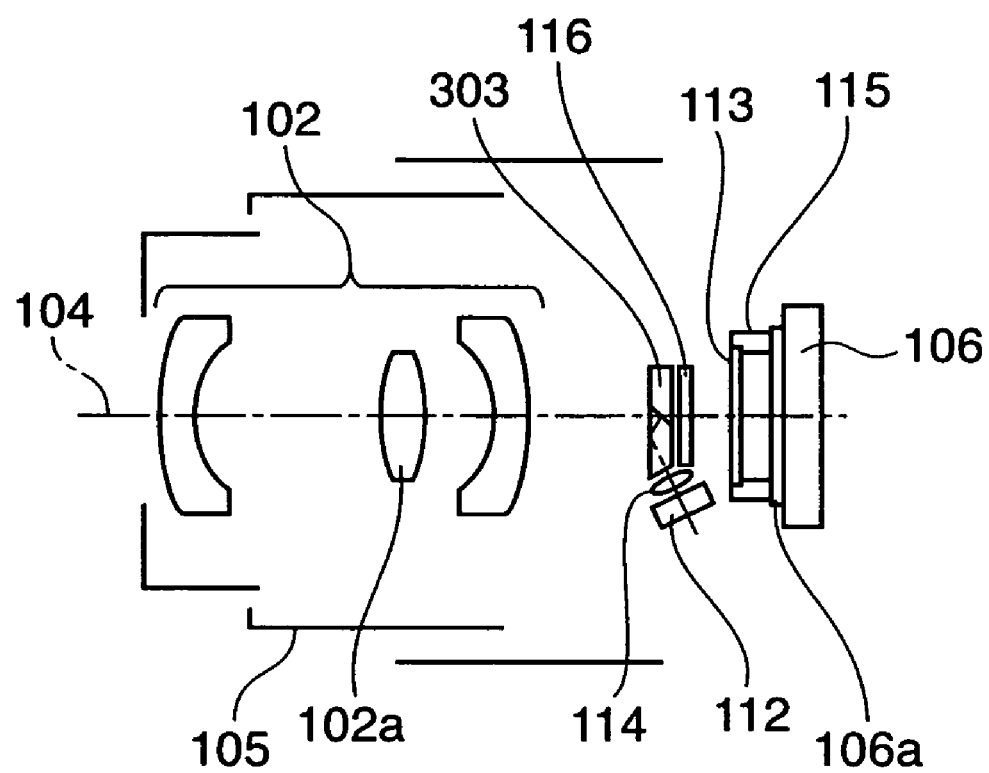
FIG. 30 is a sectional view showing the arrangement of a lens barrel portion of the digital camera.

FIG. 29 is a sectional view showing the arrangement of a digital camera as an image capturing apparatus according to this embodiment, and FIG. 30 is a sectional view showing the arrangement of a lens barrel portion of the digital camera.

Referring to FIGS. 29 and 30, reference numeral 303 denotes a beam splitter which serves as a light beam splitting device, and comprises prisms having a total reflection surface. The same reference numerals in FIGS. 29 and 30 denote the same elements having the same functions as those in FIG. 1, and a description thereof will be omitted. As can be seen from FIGS. 29 and 30, the difference between this embodiment and the first and second embodiments lies in the structure of the beam splitter 303, and a description will be given focused on this difference.

Figure 31A:
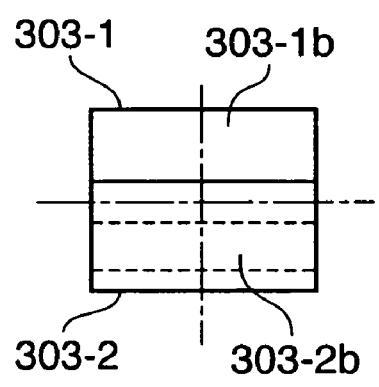
FIG. 31A is a front view of a beam splitter.
Figure 31B:
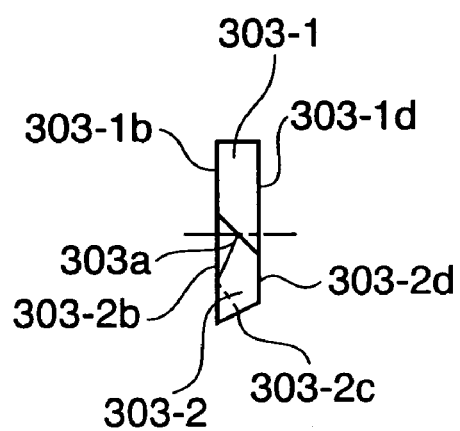
FIG. 31B is a side view of the beam splitter.

FIG. 31A is a front view of the beam splitter 303, and FIG. 31B is a side view of the beam splitter 303.

The light splitting function of the beam splitter 303 will be described below using FIGS. 31A and 31B. The beam splitter 303 is formed by cementing two prisms 303-1 and 303-2 at a light splitting function surface 303a. A light entrance surface of the beam splitter 303 is defined by a surface 303-1b of the prism 303-1 and a surface 303-2b of the prism 303-2, and an exit surface of straight traveling light is defined by a surface 303-1d of the prism 303-1 and a surface 303-2d of the prism 303-2.

There are no gap between the surface 303-1b of the prism 303-1 and the surface 303-2b of the prism 303-2, and no gap between the surface 303-1d of the prism 303-1 and the surface 303-2d of the prism 303-2. Also, the surfaces 303-1b and 303-1d of the prism 303-1 are parallel to each other, and the surfaces 303-2b and 303-2d of the prism 303-2 are parallel to each other. Therefore, the beam splitter 303 serves as a parallel plate with respect to straight traveling light.

The surface 303-1b of the prism 303-1 and the light splitting function surface 303a have different tilt angles, and the surface 303-2d of the prism 303-2 and the light splitting function surface 303a have different tilt angles. The surface 303-1b of the prism 303-1 and the light splitting function surface 303a intersect each other, and the surface 303-2d of the prism 303-2 and the light splitting function surface 303a intersect each other.

Of a light beam which enters the beam splitter 303 from the light entrance surface defined by the surface 303-1b of the prism 303-1 and the surface 303-2b of the prism 303-2, a light beam reflected by the light splitting function surface 303a is totally reflected by the surface 303-2b of the prism 303-2 and leaves from a surface 303-2c. Note that the light splitting function surface 303a may be formed on either the prism 303-1 or 303-2.

Figure 32:
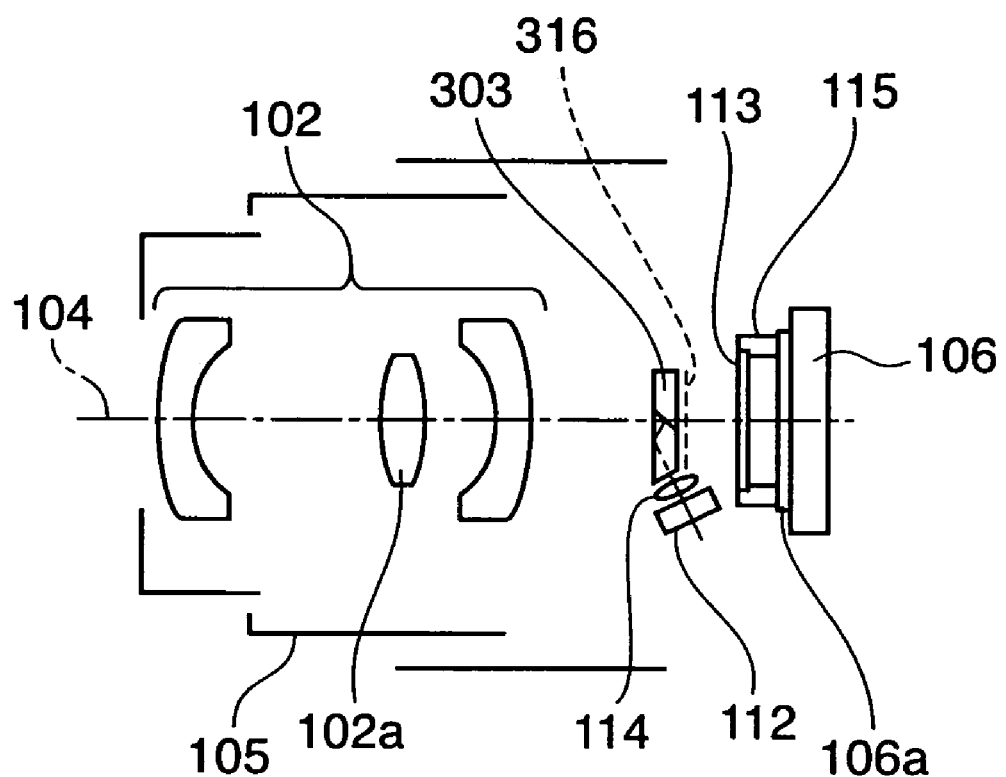
FIG. 32 is a sectional view showing the arrangement of a lens barrel portion of the digital camera.
Figure 33A:
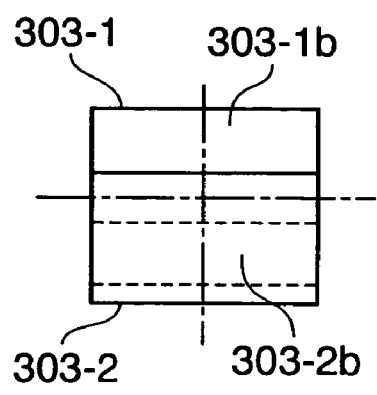
FIG. 33A is a front view of a beam splitter.
Figure 33B:
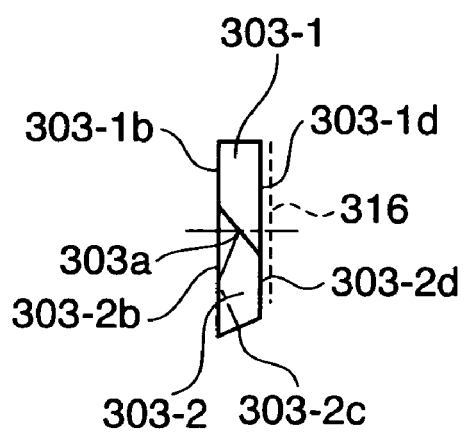
FIG. 33B is a side view of the beam splitter.

As in the example described in the above second embodiment, as shown in FIG. 32 and FIGS. 33A and 33B, a polarizing filter (extinction device) 316 that absorbs the same polarized light components as a light beam reflected by the light splitting function surface 303a may be added to the beam splitter 303. In this case, the polarizing filter 316 is preferably formed on a smooth surface defined by the surface 303-1d of the prism 303-1 and the surface 303-2d of the prism 303-2 after the prisms 303-1 and 303-2 are bonded.

The effect of using total reflection will be described below with reference to FIGS. 34 and 35.

Figure 34:
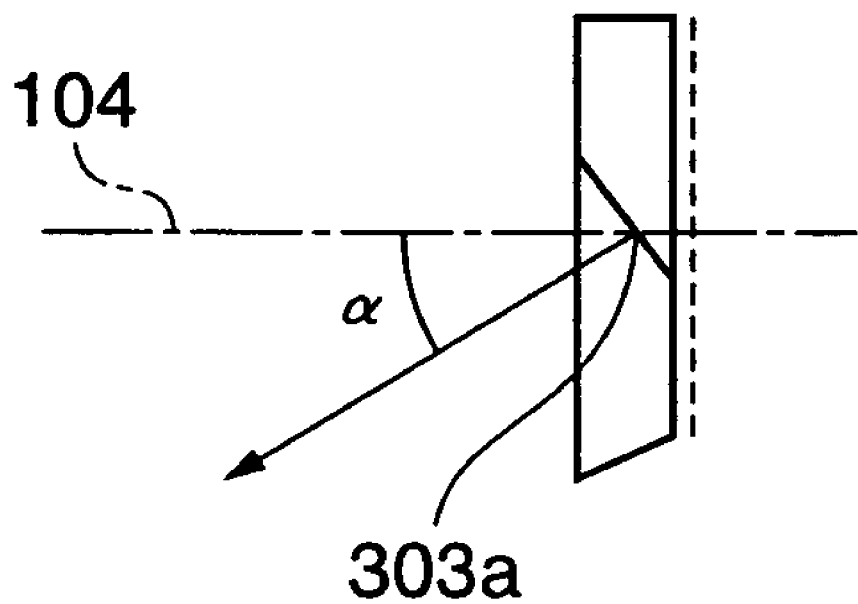
FIG. 34 is a view showing an angle a light splitting function surface makes with an optical axis.
Figure 35:
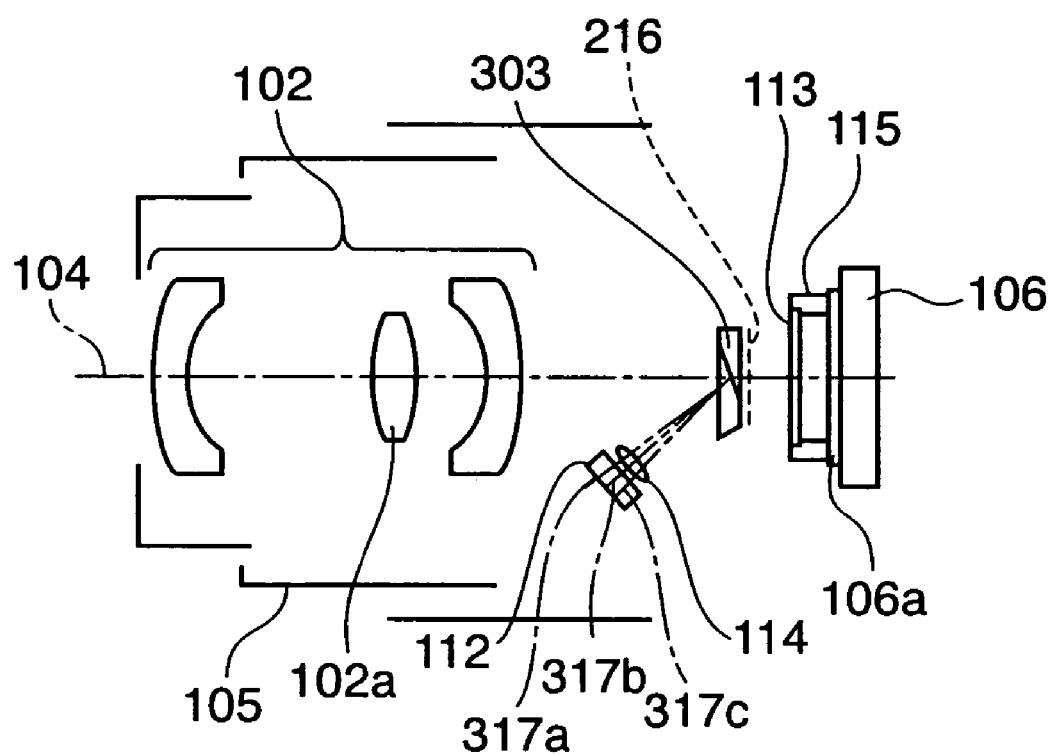
FIG. 35 is a view showing an example in which the angle the light splitting function surface makes with the optical axis is too close to 0°.

FIG. 34 shows an angle α the light splitting function surface 303a makes with the optical axis 104, and FIG. 35 shows an example in which the angle α the light splitting function surface 303a makes with the optical axis 104 is too close to 0°.

The angle α the light splitting function surface 303a makes with the optical axis 104 shown in FIG. 34 will be examined using FIGS. 34 and 35. In order to achieve a low-profile structure of the beam splitter 303, α must be brought closer to 0°. On the other hand, when α is extremely close to 0°, as shown in FIG. 35, the entire apparatus adversely becomes thickened so as to lay out the focus detection sensor 112 and condenser lens 114 not to intercept a light beam that travels toward the CMOS light-receiving sensor 106.

As shown in FIG. 35, since the exit surface of the beam splitter 303 (prism) becomes an entrance surface from the object side, an exit surface which is oblique with respect to light rays is normally set, as shown in FIG. 35. At this time, according to the dispersion characteristics of a prism material, light rays which leave the beam splitter 303 toward the focus detection sensor 112 via the condenser lens 114 suffer so-called chromatic dispersion depending on wavelengths like a long wavelength 317a and short wavelength 317c. Note that 317b is an intermediate wavelength between the long and short wavelengths 317a and 317c.

Hence, in this embodiment, since a light beam is totally reflected using the entrance surface 303-2b of the beam splitter 303, an AF light beam is guided outside the optical path of a photographing light beam without causing chromatic dispersion, and a size reduction of the entire apparatus is realized.

The angle α the light splitting function surface 303a of the beam splitter 303 makes with the optical axis 104 is set to take total reflection at the entrance surface 303-2b into account in consideration of the refractive index of the material of the beam splitter 303, and not to eclipse the light beam of the focus detection visual fields of the focus detection sensor 112 shown in FIG. 8, and the beam splitter 303 is set to have an appropriate prism shape.

Assume that the spectral transmittance characteristics of the light splitting function surface 303a of the beam splitter 303 are the same as the example of the spectral transmittance characteristics of the light splitting function surface 103a of the beam splitter 103 shown in FIG. 6.

As can be seen from the description of the first and second embodiments, in this embodiment as well, substantially the same luminance levels can be set on a portion where the light splitting function surface 203a exists and a portion where it does not exist, and an image to be captured is not influenced.

Figure 36:
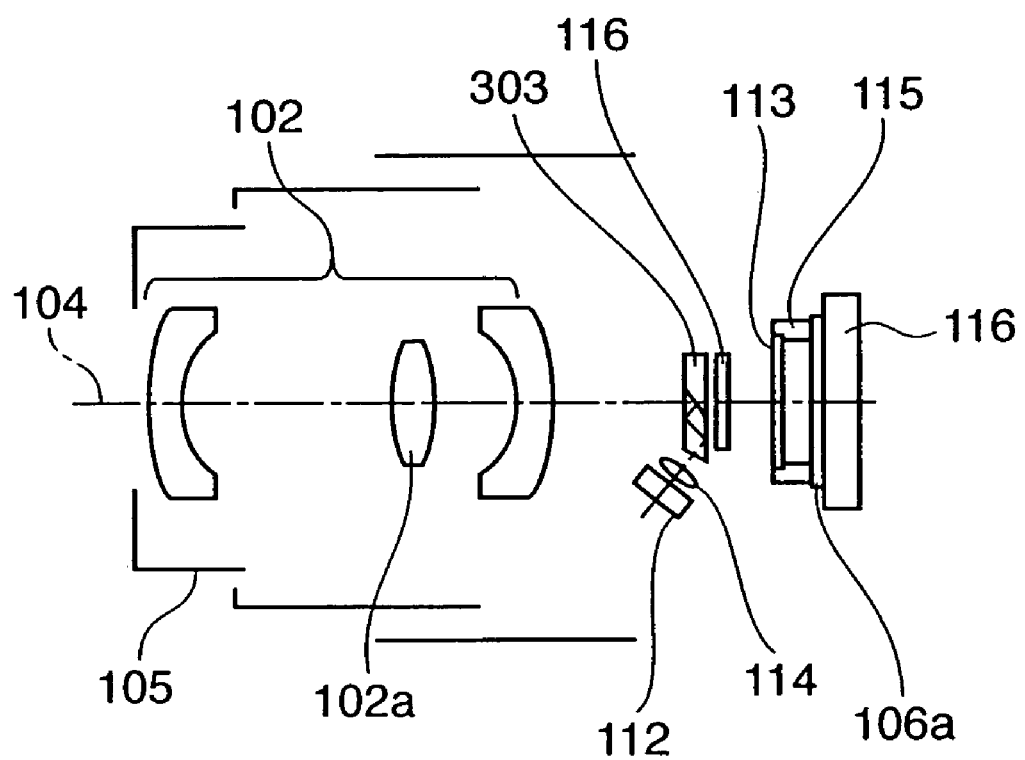
FIG. 36 is a view showing an example in which light is totally reflected twice in a beam splitter (prism)
Figure 37A:
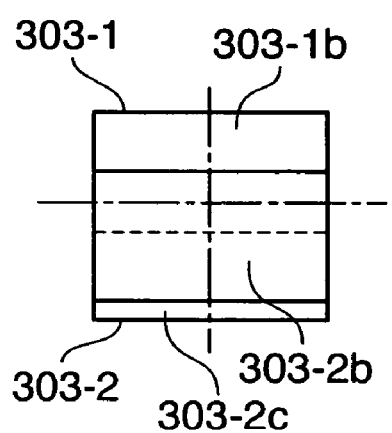
FIG. 37A is a front view of a beam splitter.
Figure 37B:
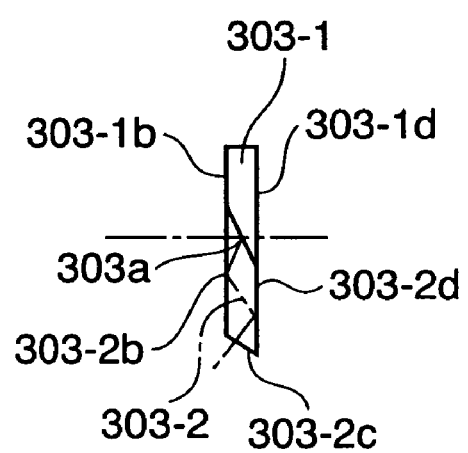
FIG. 37B is a side view of the beam splitter.

FIG. 36 and FIGS. 37A and 37B show an example which is effective when the thickness of the beam splitter 303 is dominant as a modification of this embodiment.

FIG. 36 shows an example in which a light beam is totally reflected twice in the beam splitter (prism) 303, FIG. 37A is a front view of the beam splitter 303, and FIG. 37B is a side view of the beam splitter 303.

In FIG. 36 and FIGS. 37A and 37B, due to a limitation on the condenser lens 114 which must be located outside the optical path of a light beam which travels toward the CMOS light-receiving sensor 106, a limitation on the number of times of total reflection, and a limitation not to eclipse a light beam of the focus detection visual fields of the focus detection sensor 112 shown in FIG. 8, the thickness of the beam splitter 303 cannot be sufficiently reduced in some cases. In such case, the profile of the beam splitter can be reduced by causing a larger number of times of total reflection in the prism 303-2 of the beam splitter 303, as shown in FIG. 36 and FIGS. 37A and 37B.

Note that FIG. 36 and FIGS. 37A and 37B show an example in which a light beam is totally reflected twice in the prism 303-2 of the beam splitter 303, but a larger number of times of total reflection may be used.

In case of this embodiment, the polarizing filter (extinction device) 116 is arranged independently of the beam splitter 303 so that a light beam that travels toward the AF element is not absorbed by the polarizing filter 116. Even in this case, a small gap need only be formed between the polarizing filter 116 and beam splitter 303. Since the polarizing filter 116 is normally a low-profile part, it can contribute to a low-profile apparatus when the thickness of the beam splitter 303 is dominant.

As described above, this embodiment can contribute to a further size reduction and cost reduction of the apparatus without losing the effect of attaining uniform luminance on the CMOS light-receiving sensor 106 by a simple arrangement.

Fourth Embodiment

The fourth embodiment of the present invention is different from the aforementioned first embodiment in the following point. Since other elements of this embodiment are the same as corresponding ones of the first embodiment (FIGS. 1 and 2, and the like) described above, a description thereof will be omitted.

Figure 38:
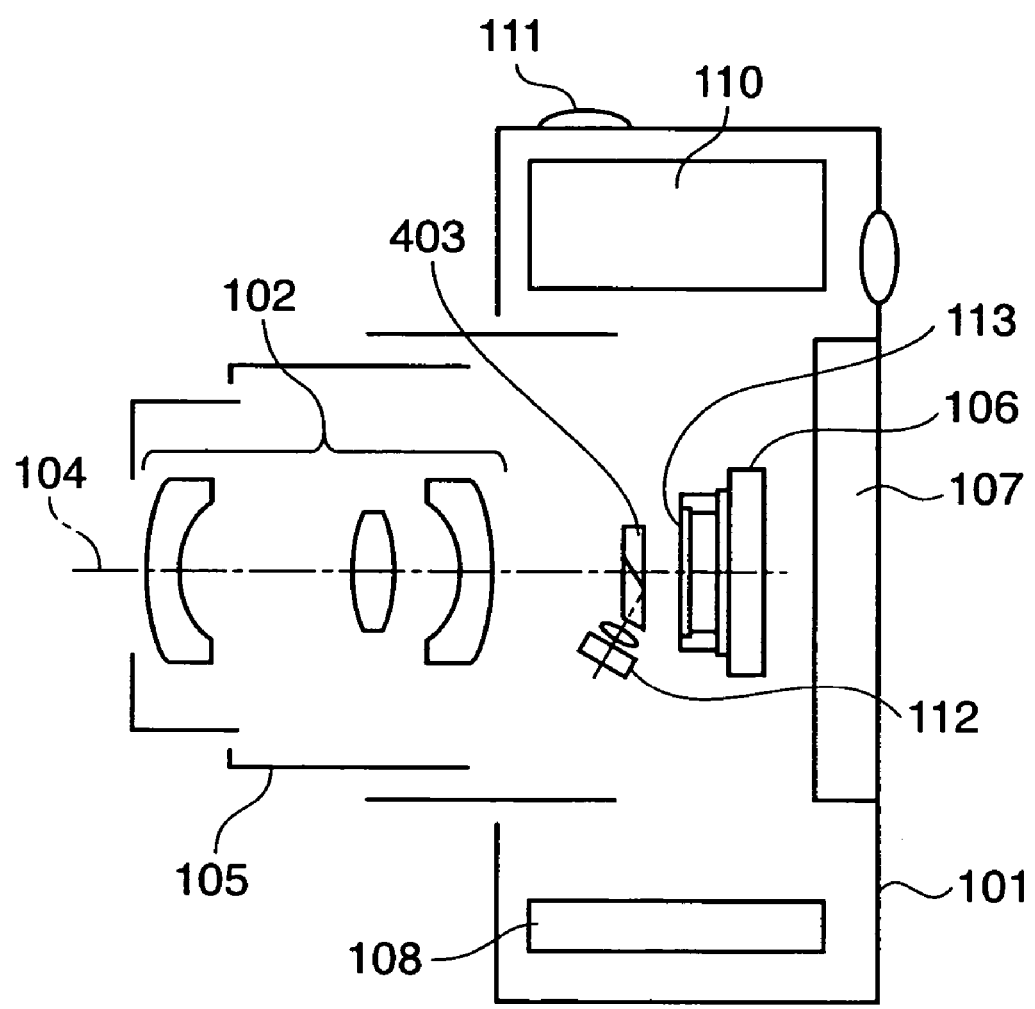
FIG. 38 is a sectional view showing the arrangement of a digital camera as an image capturing apparatus according to the fourth embodiment of the present invention.
Figure 39:
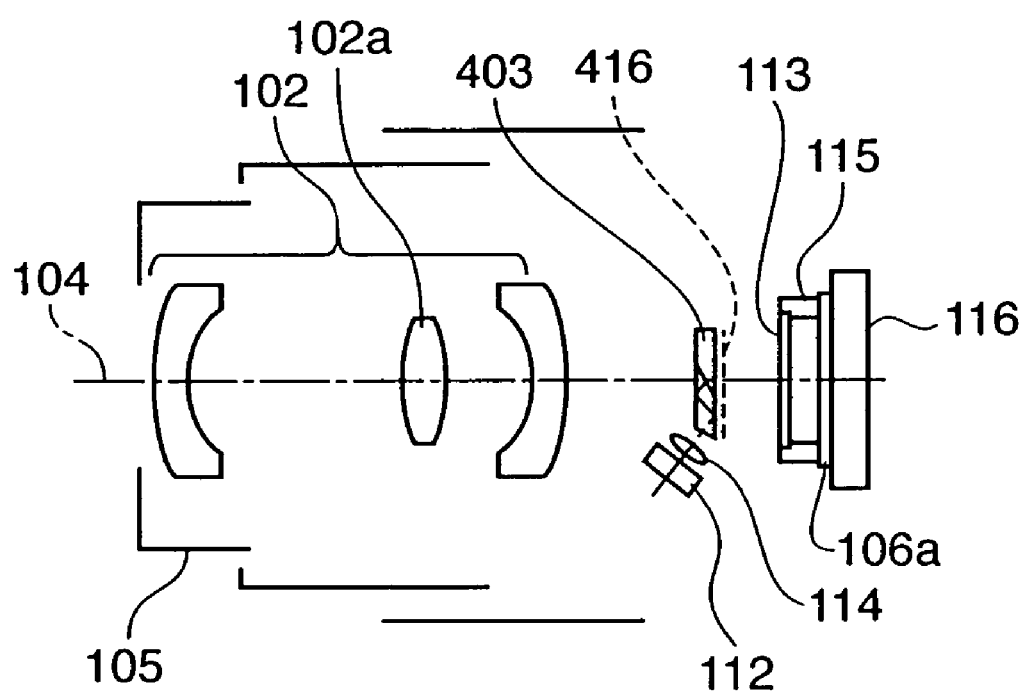
FIG. 39 is a sectional view showing the arrangement of a lens barrel portion of the digital camera.

FIG. 38 is a sectional view showing the arrangement of a digital camera as an image capturing apparatus according to this embodiment, and FIG. 39 is a sectional view showing the arrangement of a lens barrel portion of the digital camera.

Referring to FIGS. 38 and 39, reference numeral 403 denotes a beam splitter which serves as a light beam splitting device, and comprises prisms which have a total reflection surface and a polarizing filter at its exit surface. The beam splitter 403 has a function of changing the direction of polarization of a light beam split by a light splitting function surface 403a through 180°. The same reference numerals in FIGS. 38 and 39 denote the same elements having the same functions as those in FIG. 1, and a description thereof will be omitted. As can be seen from FIGS. 38 and 39, the difference between this embodiment and the first to third embodiments lies in the structure of the beam splitter 403, and a description will be given focused on this difference.

Figure 40A:
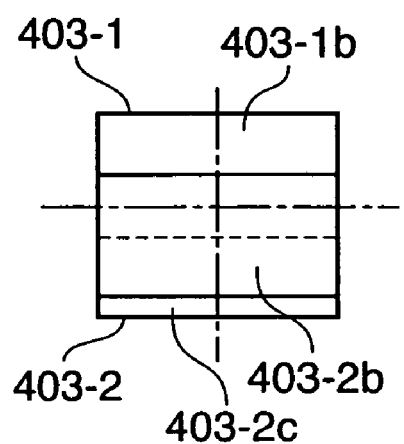
FIG. 40A is a front view of a beam splitter.
Figure 40B:
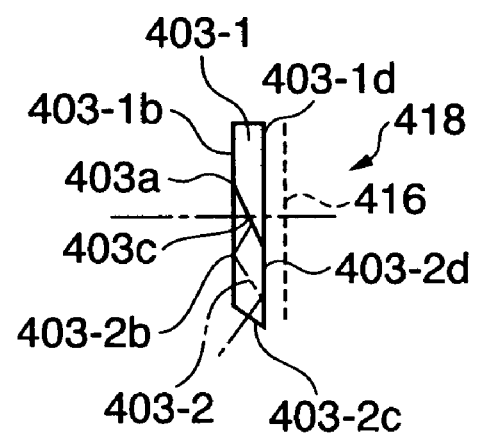
FIG. 40B is a side view of the beam splitter.

FIG. 40A is a front view of the beam splitter 403, and FIG. 40B is a side view of the beam splitter 403.

Figure 41:
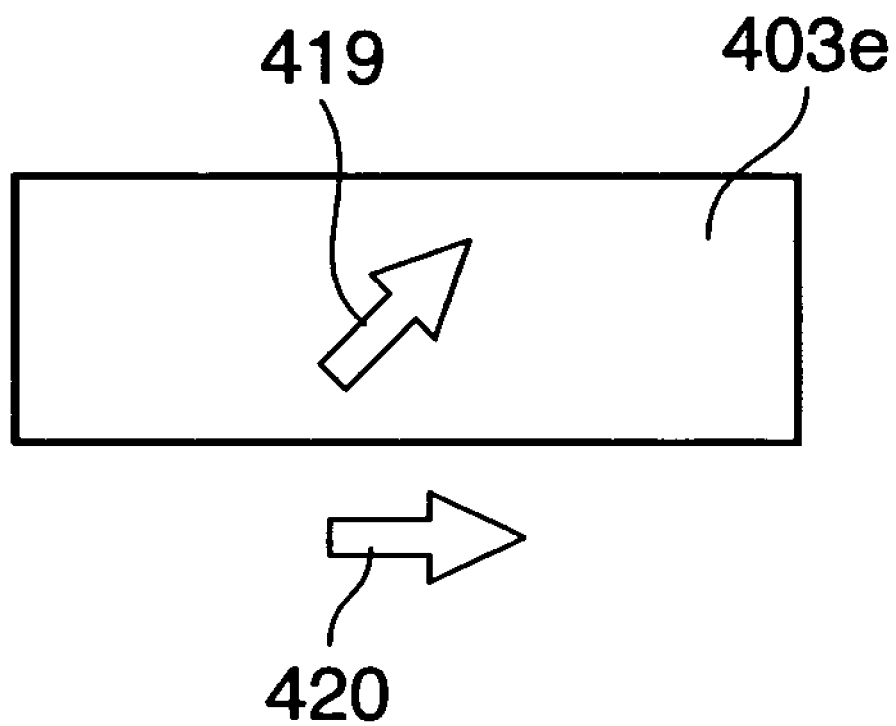
FIG. 41 is a view showing a halfwave plate when viewed from the direction of the arrow.

In FIGS. 40A and 40B, since the basic light splitting function of the beam splitter 403 is as described in the third embodiment, a description thereof will be omitted. This embodiment is characterized in that a halfwave plate 403e which rotates the direction of polarization through 180° after a light beam is reflected by the light splitting function surface 403a of the beam splitter until it reaches an exit surface 403-2d of the beam splitter 403 is provided. FIG. 41 shows the layout of the halfwave plate 403e.

FIG. 41 is a view showing the halfwave plate 403e viewed from the direction of an arrow.

Referring to FIG. 41, reference numeral 419 denotes an optic axis direction of the halfwave plate 403e; and 420, a polarization azimuth angle of a light beam reflected by the light splitting function surface 403a. The halfwave plate 403e is arranged to affect a light beam reflected by the light splitting function surface 403a, so that the optic axis direction 419 makes 45° with the polarization azimuth angle 420 when viewed from a light ray direction 418 (see FIG. 40B) reflected by light splitting function surface 403a.

The effect of the halfwave plate 403e will be described below using FIG. 42.

In the example in which a large number of times of total reflection are made in the beam splitter described in the third embodiment, when the beam splitter and extinction device form an integrated structure, a light beam which should travel toward the focus detection sensor 112 is also absorbed by the extinction device arranged at the exit surface side of the beam splitter.

For example, assume that the light splitting function surface 403a of the beam splitter 403 transmits P-polarized light and reflects S-polarized light. In this case, a polarizing filter (extinction device) 416 is configured to transmit P-polarized light and to absorb S-polarized light.

Figure 42:
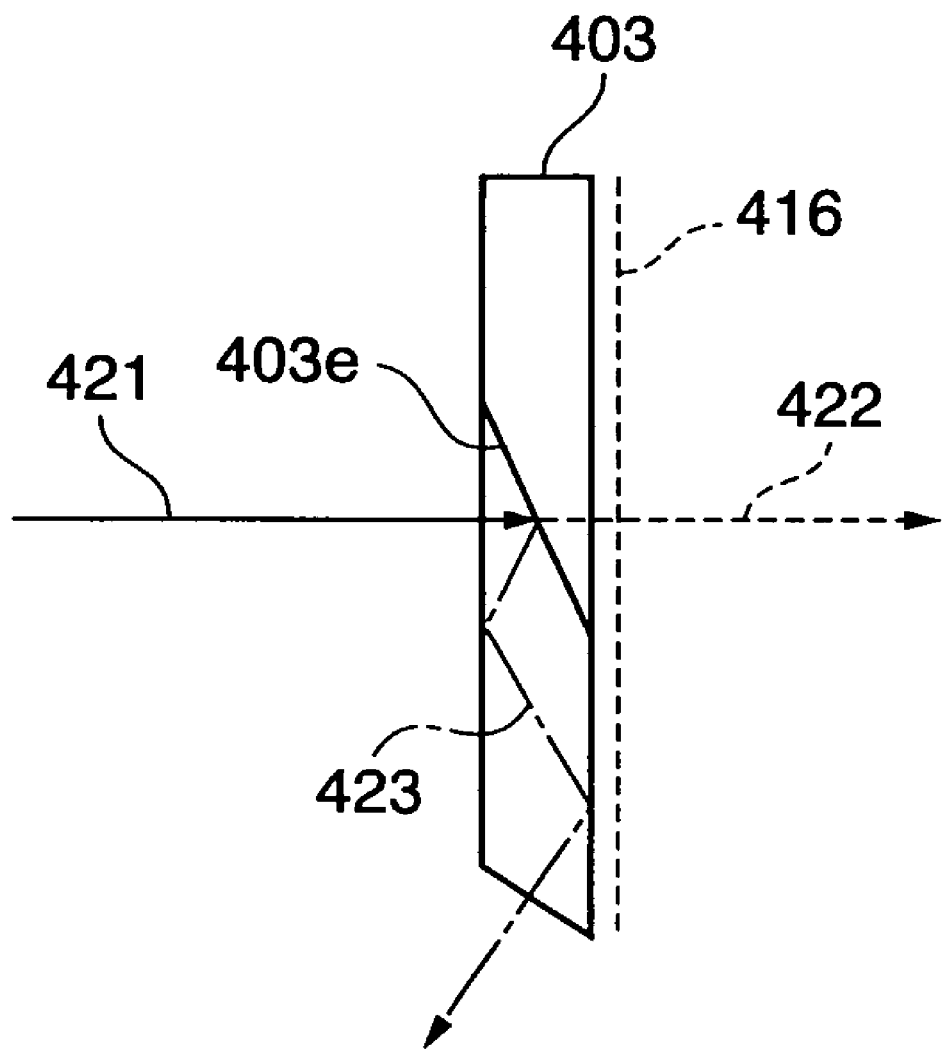
FIG. 42 is a view for explaining the function of the halfwave plate.

FIG. 42 is a view for explaining the function of the halfwave plate 403e.

Referring to FIG. 42, a light beam 423 reflected by the light splitting function surface 403a of the beam splitter 403 is a light beam in which S-polarized light is dominant. If a plurality of number of times of total reflection are used, the reflected light beam 423 is absorbed by the polarizing filter 416 arranged on the exit surface side of the beam splitter 403 before it reaches the focus detection sensor 112 (see FIG. 39).

Hence, in this embodiment, the direction of polarization of a light beam is changed after the light beam is reflected by the light splitting function surface 403a of the beam splitter until it reaches the exit surface 403-2d, so that a light beam which should travel toward the focus detection sensor 112 is not absorbed by the extinction device 416 on the exit surface side of the beam splitter 403. That is, since the light beam reflected by the light splitting function surface 403a is converted from S-polarized light into P-polarized light by the halfwave plate 403e before it reaches the polarizing filter 416, it is never absorbed by the polarizing filter 416.

As a modification of this embodiment, an example of the beam splitter 403 when the halfwave plate 403e and beam splitter 403 are integrated will be described below using FIGS. 43A to 44.

Figure 43A:
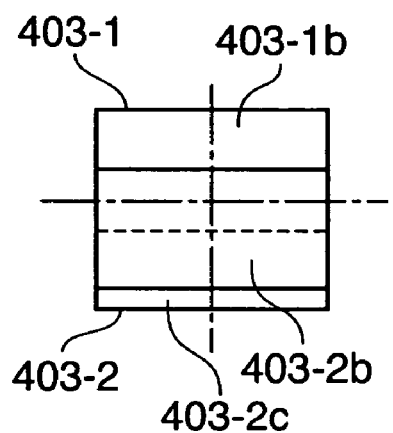
FIG. 43A is a front view of a beam splitter.
Figure 43B:
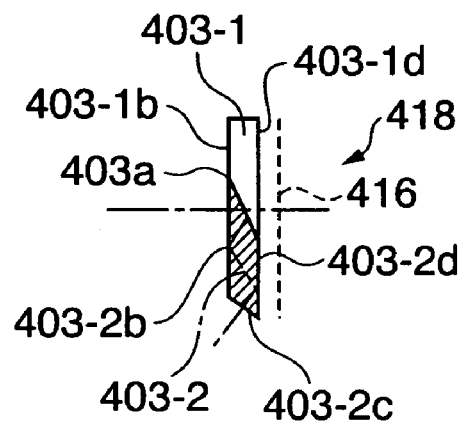
FIG. 43B is a side view of the beam splitter.
Figure 44:
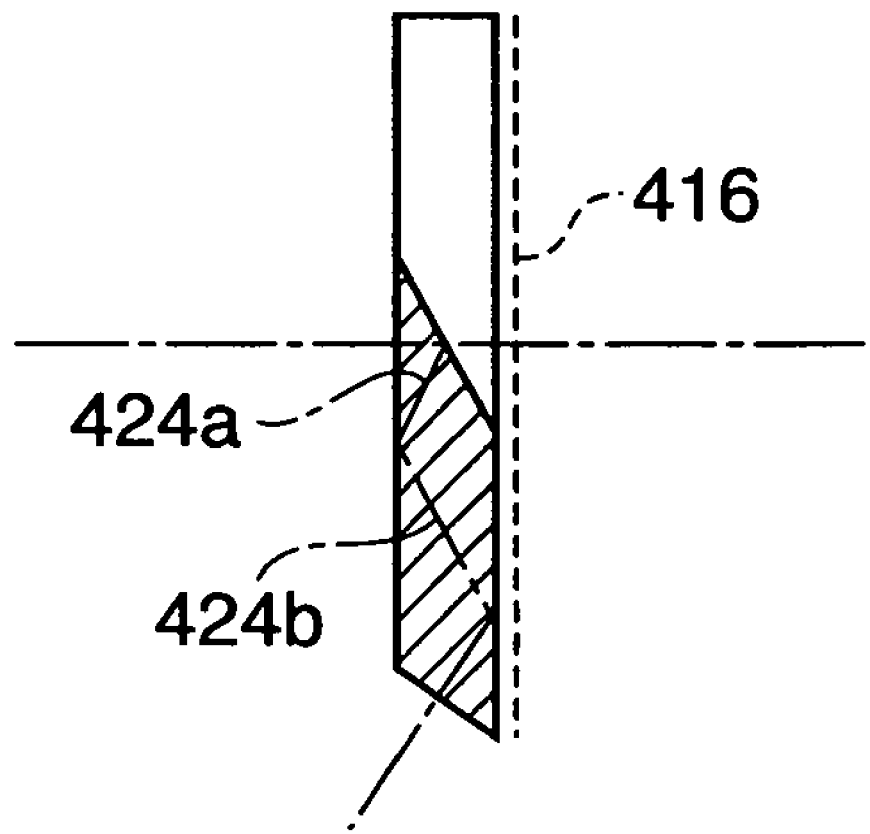
FIG. 44 is a view showing an optical path difference.

FIG. 43A is a front view of the beam splitter 403, FIG. 43B is a side view of the beam splitter 403, and FIG. 44 shows an optical path difference.

Referring to FIGS. 43A and 43B and FIG. 44, for example, the beam splitter 403 uses an optical material having birefringence as a material of the prism 403-2, and is formed, so that the optical axis direction makes 45° when viewed from the direction 418 in FIG. 43B and the optical path difference between ordinary and extraordinary rays in optical paths 424a and 424b in FIG. 44 becomes wavelength/2. With this arrangement, since a light beam reflected by the light splitting function surface 403a of the beam splitter 403 is converted from S-polarized light into P-polarized light before it reaches the extinction device 416, it is never absorbed by the extinction device 416.

As described above, this embodiment can contribute to a further size reduction and cost reduction of the apparatus without losing the effect of attaining uniform luminance on the CMOS light-receiving sensor 106 by a simple arrangement.

Fifth Embodiment

The fifth embodiment of the present invention is different from the aforementioned first embodiment in the following point. Since other elements of this embodiment are the same as corresponding ones of the first embodiment (FIGS. 1 and 2, and the like) described above, a description thereof will be omitted.

Figure 45:
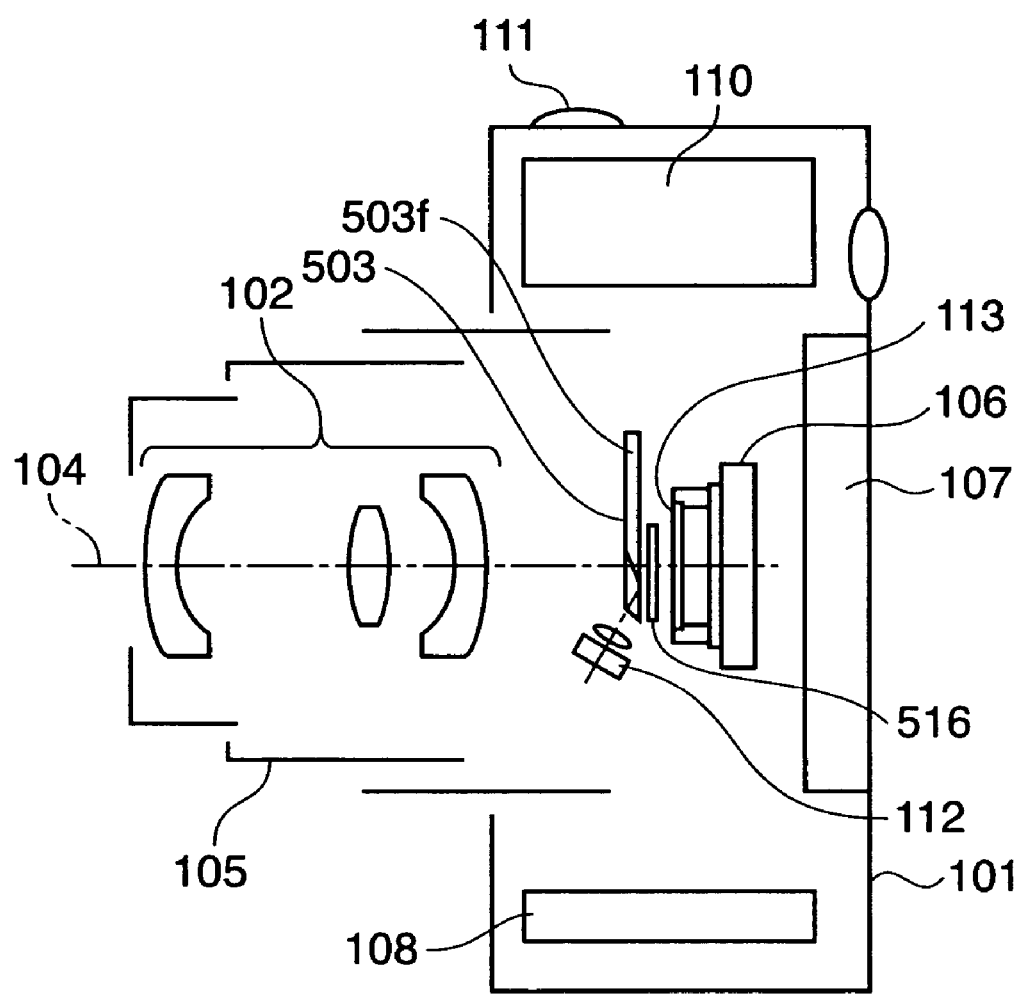
FIG. 45 is a sectional view showing the arrangement (upon insertion) of a digital camera as an image capturing apparatus according to the fifth embodiment of the present invention.
Figure 46:
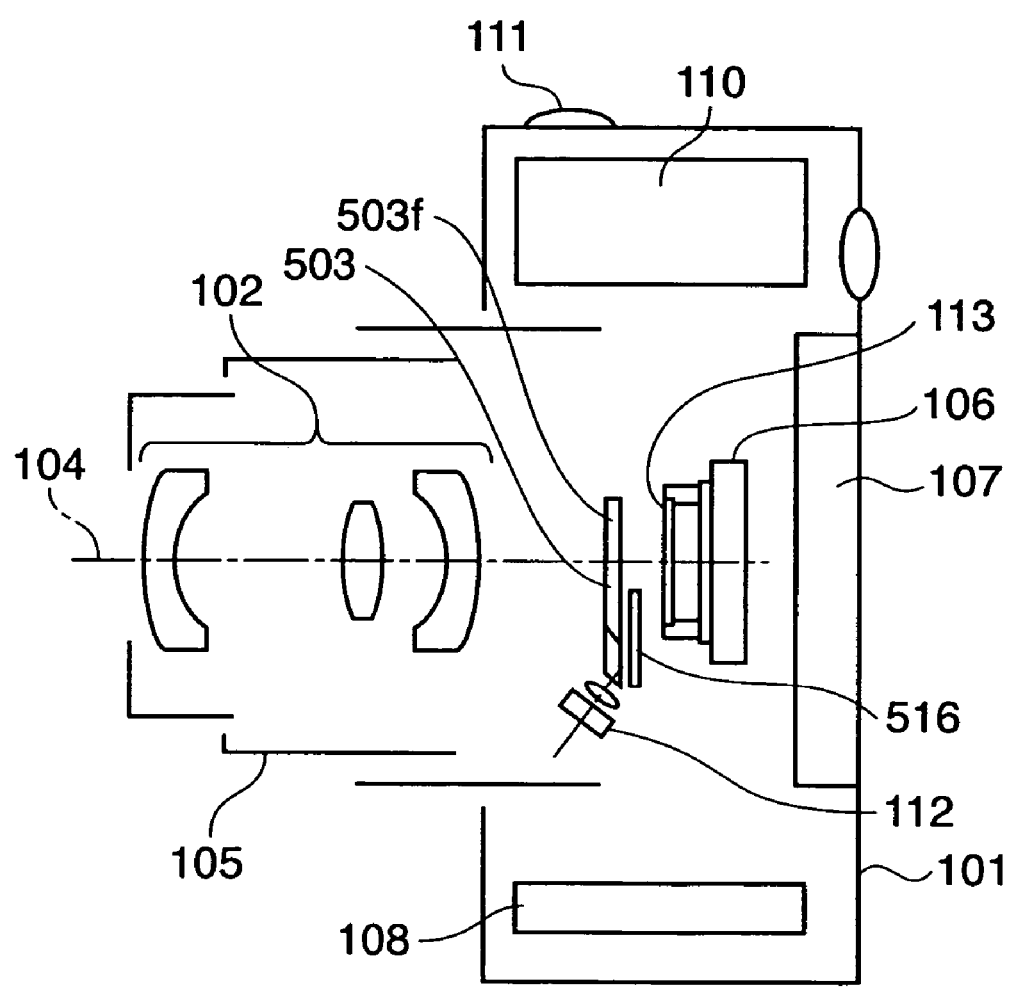
FIG. 46 is a sectional view showing the arrangement (upon retraction) of the digital camera.

FIG. 45 is a sectional view showing the arrangement (upon insertion) of a digital camera as an image capturing apparatus according to this embodiment, and FIG. 46 is a sectional view showing the arrangement (upon retraction) of the digital camera.

Referring to FIGS. 45 and 46, reference numeral 503 denotes a beam splitter which serves as a light beam splitting device. The same reference numerals in FIGS. 45 and 46 denote the same elements having the same functions as those in FIG. 1, and a description thereof will be omitted. As can be seen from FIGS. 45 and 46, the difference between this embodiment and the first to fourth embodiments lies in that the beam splitter 503 and a polarizing filter (extinction device) 516 are movable, and a description will be given focused on this difference.

This embodiment is characterized in that the beam splitter 503 and extinction device 516 are integrated, and the beam splitter 503 and polarizing filter 516 can be inserted (entered) and retracted into/from an optical path by a drive mechanism (drive device: not shown). FIG. 45 shows a state wherein the beam splitter 503 and polarizing filter 516 are inserted into the optical path, and FIG. 46 shows the state wherein the beam splitter 503 and polarizing filter 516 are retracted outside the optical path. The polarizing filter 516 is located to cover the entire photographing light beam when it is inserted into the optical path. However, the polarizing filter 516 is located not to influence the photographing light beam when it is retracted outside the optical path.

When the beam splitter 503 is retracted outside the optical path, a surface 503f which has no light beam splitting function surface and has substantially the same optical path length as that of the beam splitter is inserted into the optical path so as not to change the optical path length from the photographing optical system 102 to the CMOS light-receiving sensor 106. With this arrangement, when the beam splitter 503 and polarizing filter 516 are inserted and retracted into/from the optical path together, only the luminance can be changed without causing a change in focus.

For example, when an object with a very low luminance level is to be photographed, since the amount of light to be guided to the focus detection sensor 112 is lost, a sufficient luminance level cannot often be assured in the examples described in the first to fourth embodiments. In such case, a need that focus detection is made using so-called TV-AF using the contrast of the CMOS light-receiving sensor 106, and luminance is prioritized at the cost of speed may be used. At this time, by guiding the polarizing filter 516 outside the optical path by operating the drive mechanism (not shown), the amount of light that enters the CMOS light-receiving sensor 106 can be increased.

As described above, according to this embodiment, in addition to the effects of the first to fourth embodiments described above, even when the beam splitter 503 and polarizing filter 516 are retracted upon image capturing while retracting them from the optical path, the auto focus detection function can be enabled at high speed without varying the focus of the photographing optical system 102. In this way, a low-luminance object can be photographed, and this embodiment can contribute to user's convenience.

Sixth Embodiment

The sixth embodiment of the present invention is different from the aforementioned first embodiment in the following point. Since other elements of this embodiment are the same as corresponding ones of the first embodiment (FIGS. 1 and 2, and the like) described above, a description thereof will be omitted.

Figure 47:
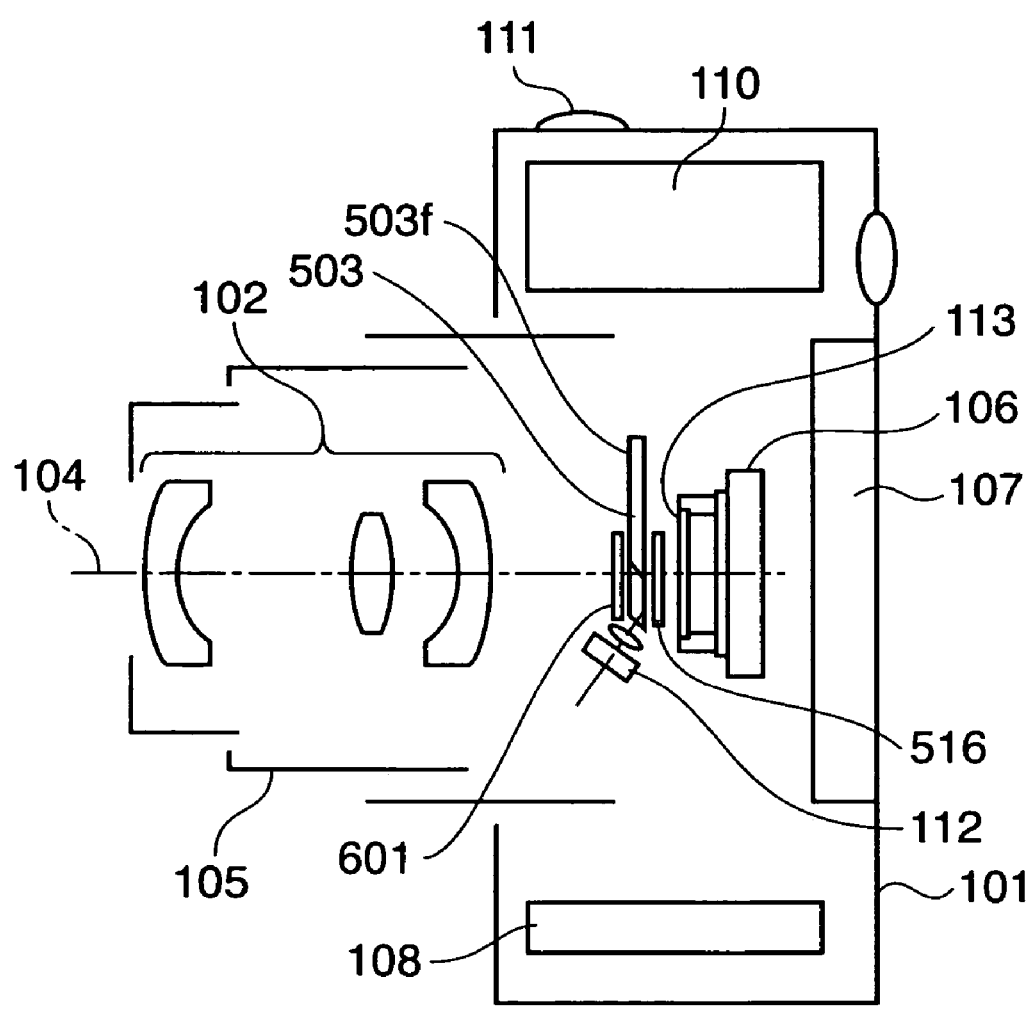
FIG. 47 is a sectional view showing the arrangement of a digital camera as an image capturing apparatus according to the sixth embodiment of the present invention.

FIG. 47 is a sectional view showing the arrangement of a digital camera as an image capturing apparatus according to this embodiment.

Referring to FIG. 47, reference numeral 503 denotes a beam splitter which serves as a light beam splitting device; and 601, a quarterwave plate. The same reference numerals in FIG. 47 denote the same elements having the same functions as those in FIG. 1, and a description thereof will be omitted. As can be seen from FIG. 47, the difference between this embodiment and the fifth embodiment lies in that the quarterwave plate 601 is arranged, and a description will be given focused on this difference.

This embodiment is characterized in that the quarterwave plate 601 is arranged between the beam splitter 503 and photographing optical system 102. In general, when photographing is made in natural light, a specific polarized light component is not largely included. However, some objects may largely have only a specific polarized light component upon shooting reflection by the surface of water or glass. For such object, the amount of light on the CMOS light-receiving sensor or focus detection sensor 112 may become insufficient in focus measurement using the focus detection sensor 112 in the examples of the first to fifth embodiments described above.

Figure 48:
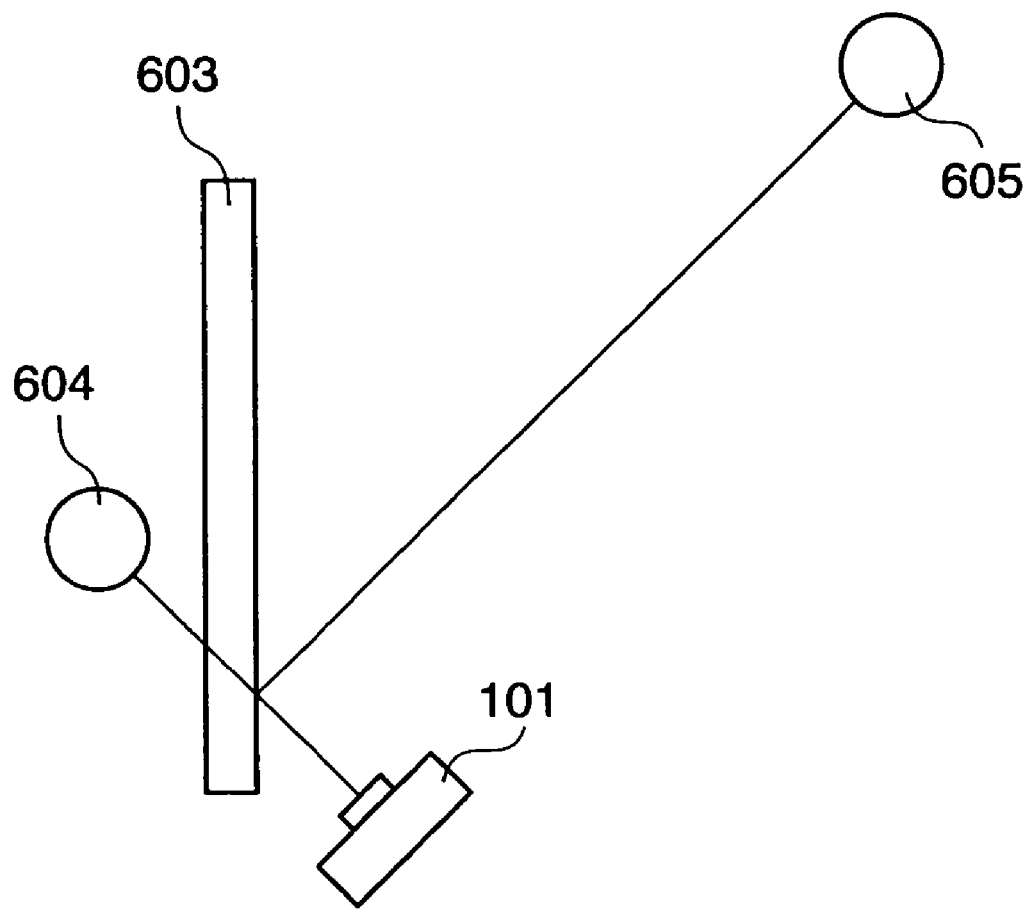
FIG. 48 is a view showing a case wherein an object is to be photographed with a half reflection surface in between by the digital camera.

FIG. 48 shows a case wherein an object 604 is to be photographed with a half reflection surface 603 in between by the digital camera.

In FIG. 48, assume that reflected light from the half reflection surface 603 largely includes a specific polarized light component, and that specific polarized light component is guided to the focus detection sensor 112. At this time, the user expects the digital camera to adjust a focus to the object 604. However, when reflected light that enters the focus detection sensor 112 is dominant, the digital camera adjusts a focus to another object 605. As a result, the object 604 is photographed as an out-of-focus image, thus making no contribution to user's convenience.

Hence, in this embodiment, the quarterwave plate 601 is arranged between the beam splitter 503 and photographing optical system 102 to convert a specific polarized light component into circularly polarized light when light that enters the focus detection sensor 112 largely includes the specific polarized light component, thus uniforming the amount of light which enters the CMOS light-receiving sensor 106 or focus detection sensor, and information included in a light beam.

Figure 49:
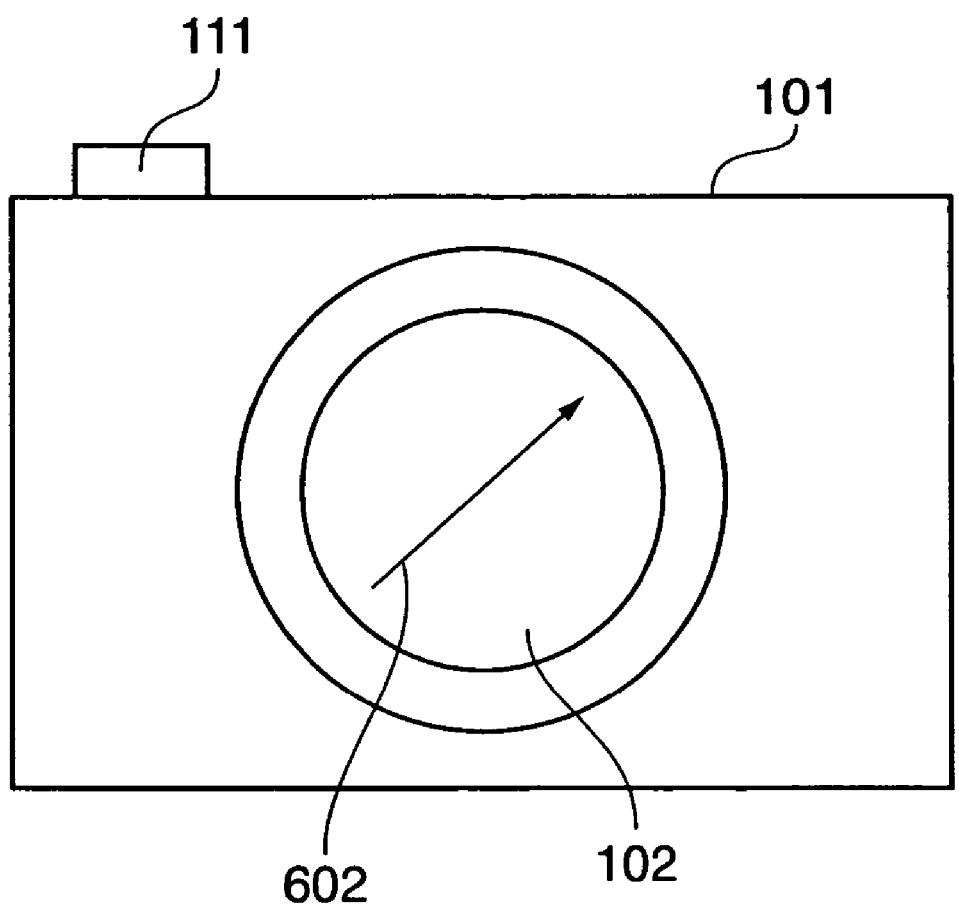
FIG. 49 is a view showing the crystal direction of a quarterwave plate.
Figure 50:
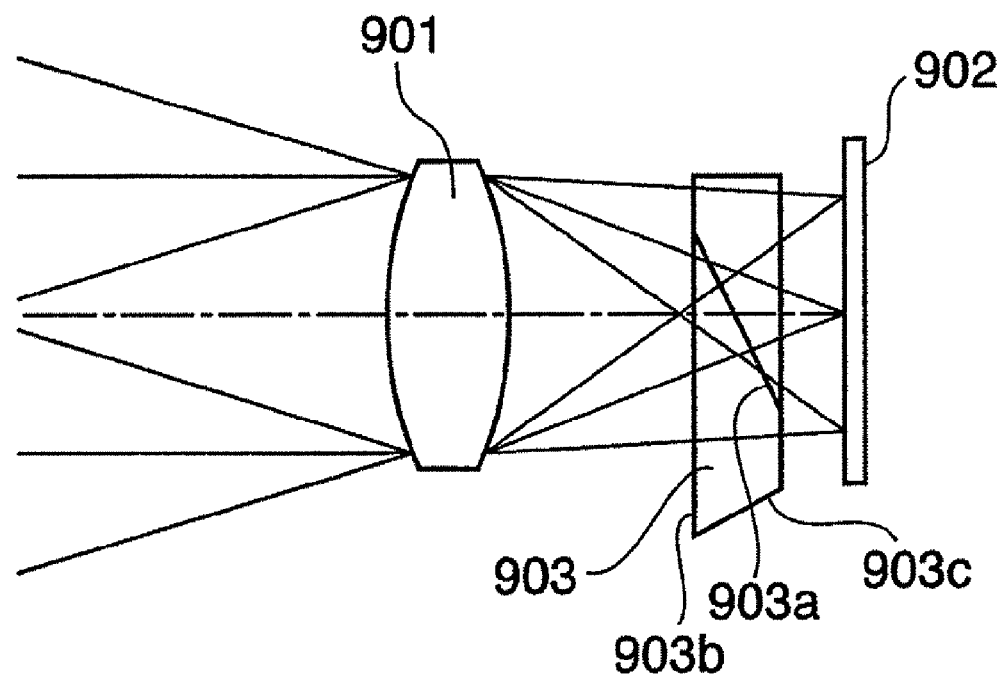
FIG. 50 is a view showing a state of luminance nonuniformity which has occurred in an optical apparatus according to the prior art.
Figure 51:
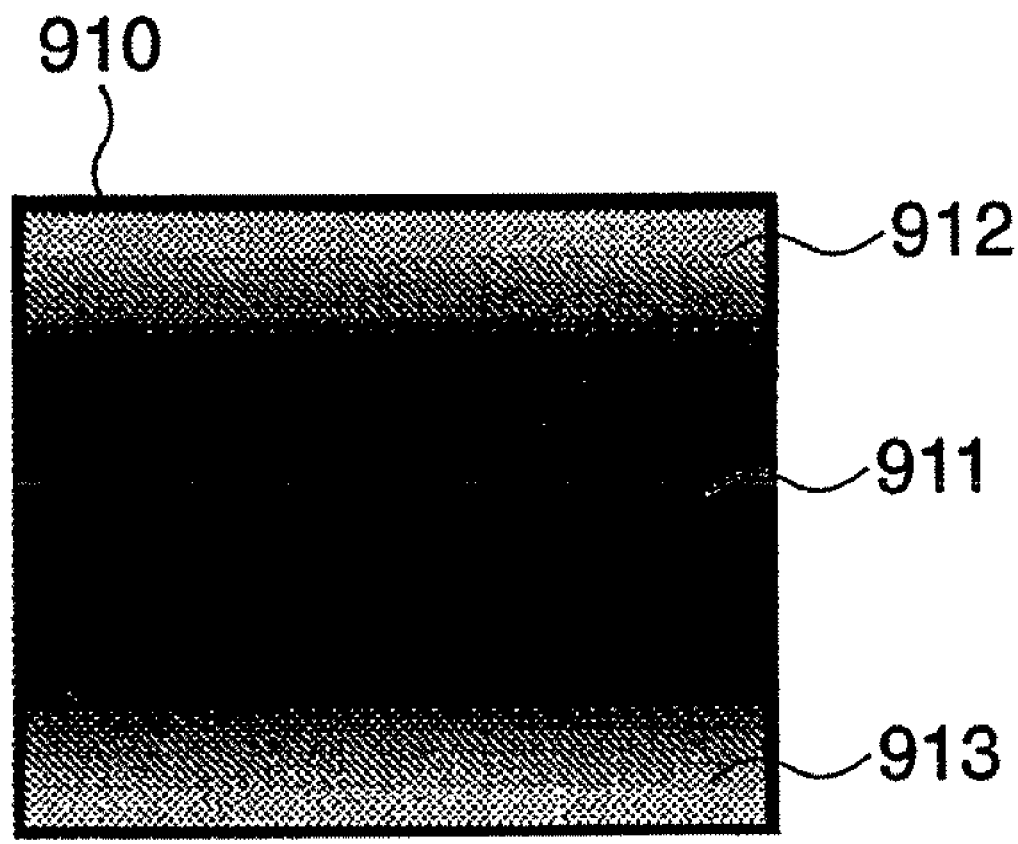
FIG. 51 shows the degree of occurrence of luminance nonuniformity on an image.
Figure 52:
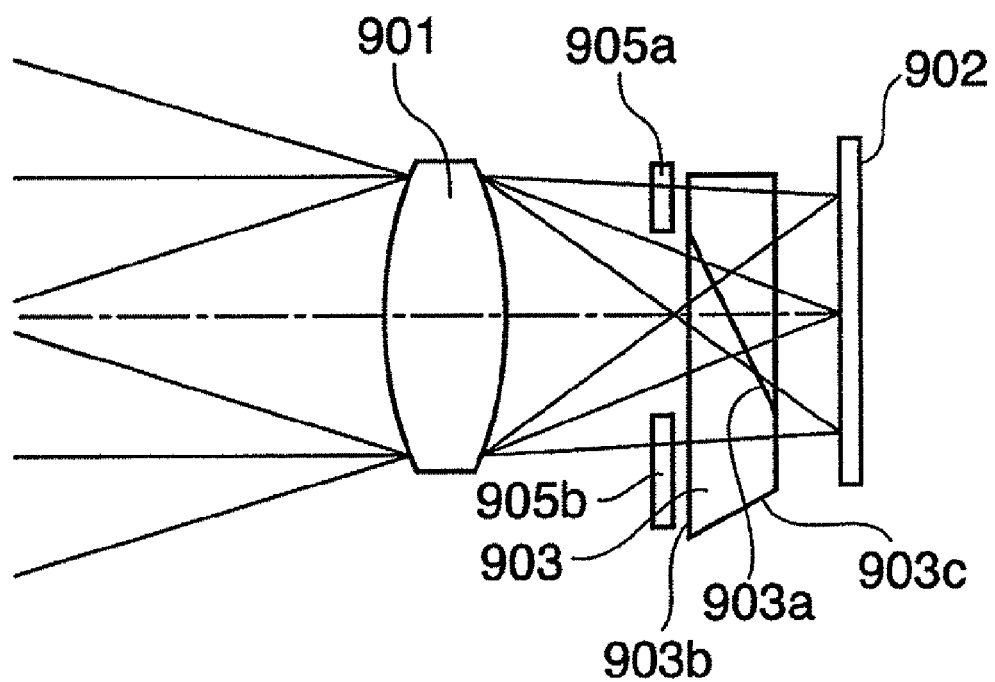
FIG. 52 is a view showing an example in which extinction parts for luminance nonuniformity correction are provided in the optical apparatus.
Figure 53A:
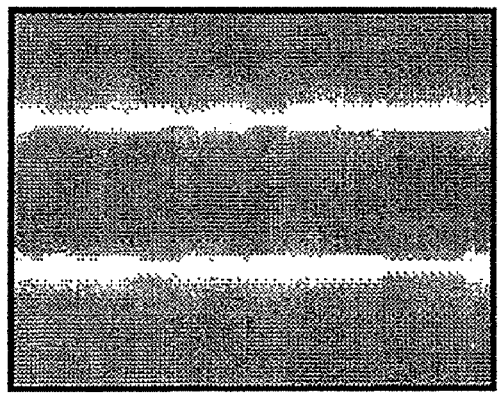
FIG. 53A shows luminance nonuniformity when a gap is formed between extinction devices.
Figure 53B:
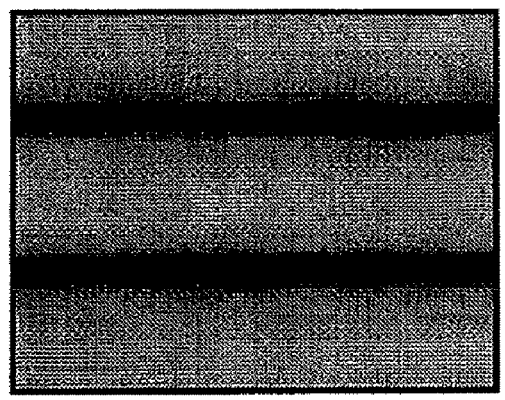
FIG. 53B shows luminance nonuniformity when the extinction devices cause overlapping.

Normally, a specific polarized light component which enters the digital camera is determined by a light source, an interface that intensifies the polarized light component, and the direction of the digital camera, and often faces the digital camera lengthwise or sidewise. In FIG. 49, reference numeral 602 denotes an optic axis direction of the quarterwave plate 601. Since the optic axis direction 602 of the quarterwave plate 601 is tilted through 45° with respect to the digital camera main body 101, the amount of light on the CMOS light-receiving sensor 106 and focus detection sensor 112, and information included in a light beam can be uniformed in many photographing scenes.

As described above, according to this embodiment, in addition to the effects of the first to fourth embodiments, image capturing that can adequately make focus detection of an object that largely includes a specific polarized light component and can focus that object can be realized.

Other Embodiments

The first to sixth embodiments have exemplified a case wherein the image capturing apparatus of the present invention is applied to the digital camera. However, the present invention is not limited to this, and the image capturing apparatus of the present invention can be applied to a lens shutter camera, single-lens reflex camera, video camera, and the like.

According to the above embodiments, an extinction device which removes substantially the same polarized light component as a polarized light component that travels toward a focus detection device as a result of light beam splitting by a light beam splitting device is arranged between the light beam splitting device and a prospective imaging plane. With this arrangement, the following effects can be simultaneously achieved: when a light beam coming from a photographing optical system is split by the light beam splitting device, the spectral characteristics of the split light beam are set to be substantially equal to those of straight traveling light and an auto focus detection function is enabled by the split light with a sufficient light amount; an increase in size of the image capturing apparatus by the light splitting structure can be prevented; and a high-quality image is obtained based on light which goes straight through the light beam splitting device.

Since the light beam splitting device has a shape by cementing two prisms at its light splitting function surface, the manufacture of the light beam splitting device is facilitated, and the thickness in the optical axis direction can be reduced, thus achieving a size reduction of the image capturing apparatus.

Since the light beam splitting device comprises a surface for totally reflecting the split light beam in the optical path toward the focus detection device, the light beam is efficiently guided outside the optical path of a photographing light beam by totally reflecting it, and a size reduction of the entire image capturing apparatus can be attained.

Since the light beam splitting device comprises a polarization direction rotation device for rotating the direction of polarization of the split light beam until it reaches a light exit surface, the light beam which should travel toward the focus detection device can be prevented from being absorbed by the extinction device.

Since the light beam splitting device and extinction device are integrally inserted and retracted into/from the optical path toward the prospective imaging plane, even a low-luminance object can be photographed. Furthermore, since an optical member having an equivalent optical path length is retracted and inserted in synchronism with the above insertion and retraction, a focus detection function can be enabled at high speed without varying the focus of the photographing optical system upon image capturing while the light beam splitting device and extinction device are retracted from the optical path.

Since a polarized light component adjustment device converts a specific polarized light component into circularly polarized light, image capturing that can adequately make focus detection of an object that largely includes a specific polarized light component and can focus that object can be realized.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Applications No. 2004-317027 filed on Oct. 29, 2004, the entire contents of which are hereby incorporated by reference herein.

What is claimed is:

1. An image capturing apparatus comprising:
  a light beam splitting device which splits a light beam into a component that travels toward a prospective imaging plane that receives an object image formed by a photographing optical system depending on a direction of polarization and a component that travels toward a focus detection device for making focus detection on the basis of the light beam split by said light beam splitting device;
  extinction parts arranged in front of said light beam splitting device; and
  an extinction device, arranged between said light beam splitting device and the prospective imaging plane, for removing substantially the same polarized light component as a polarized light component that travels toward said focus detection device as a result of light beam splitting by said light beam splitting device.

2. The apparatus according to claim 1, wherein said light beam splitting device comprises a light splitting function surface which is formed on a light entrance side as a polarization diffraction grating.

3. The apparatus according to claim 1, wherein said light beam splitting device has a shape formed by cementing two prisms at a light splitting function surface.

4. The apparatus according to claim 1, wherein said light beam splitting device comprises a surface for totally reflecting the split light beam in an optical path toward said focus detection device.

5. The apparatus according to claim 1, wherein said light beam splitting device comprises a polarization direction rotation device for rotating a direction of polarization of the split light beam until the split light beam reaches a light exit surface of said light beam splitting device, and a surface for totally reflecting the split light beam in an optical path toward said focus detection device.

6. The apparatus according to claim 1, wherein said extinction device is added to a light exit surface of said light beam splitting device.

7. The apparatus according to claim 1, further comprising a drive device for integrally inserting and retracting said light beam splitting device and said extinction device into/from an optical path toward the prospective imaging plane.

8. The apparatus according to claim 1, further comprising a polarized light component adjustment device, arranged between said light beam splitting device and the photographing optical system, for converting a specific polarized light component into circularly polarized light.

9. An image capturing apparatus comprising:
  a light beam splitting device which splits a light beam into a component that travels toward a prospective imaging plane that receives an object image formed by a photographing optical system depending on a direction of polarization and a component that travels toward a focus detection device for making focus detection on the basis of the light beam split by said light beam splitting device;
  extinction parts arranged in front of said light beam splitting device; and
  an extinction device which is arranged between said light beam splitting device and the prospective imaging plane, and has a polarization property for making a light amount of the non-split light beam close to a light amount of the light beam split by said light beam splitting device of the light beam that travels toward the prospective imaging plane.

* * * * *